United States Patent [19]
Iwasaki et al.

[11] Patent Number: 5,589,283
[45] Date of Patent: Dec. 31, 1996

[54] SOFT MAGNETIC THIN FILM

[75] Inventors: Yoh Iwasaki; Yosuke Murakami; Masao Itabashi, all of Kanagawa, Japan

[73] Assignee: Sony Corporation, Tokyo, Japan

[21] Appl. No.: 334,353

[22] Filed: Nov. 3, 1994

Related U.S. Application Data

[63] Continuation of Ser. No. 22,499, Feb. 25, 1993, abandoned.

[30] Foreign Application Priority Data

Feb. 29, 1992 [JP] Japan ................................. 4-079289
Nov. 30, 1992 [JP] Japan ................................. 4-320988

[51] Int. Cl.⁶ .................................................. G11B 5/66
[52] U.S. Cl. ............................. 428/694 R; 428/694 T; 428/694 TS; 428/692; 428/611; 428/900
[58] Field of Search ..................... 428/694 T, 694 TS, 428/694 R, 692, 611, 900

[56] References Cited

U.S. PATENT DOCUMENTS

| | | | |
|---|---|---|---|
| 4,935,314 | 6/1990 | Kobayashi et al. | 428/694 |
| 5,057,380 | 10/1991 | Mayashi et al. | 428/692 |
| 5,068,152 | 11/1991 | Maro et al. | 428/408 |

*Primary Examiner*—Leszek Kiliman
*Attorney, Agent, or Firm*—Hill, Steadman & Simpson

[57] ABSTRACT

A soft magnetic thin film is fabricated by depositing metallic particles obliquely on a substrate. The sign and magnitude of the crystalline magnetic anisotropy of the soft magnetic thin film are selected to cancel out the shape magnetic anisotropy depending on an inclined columnar crystalline structure and the stress-induced magnetic anisotropy. The soft magnetic thin film has a reduced total magnetic anisotropy. A magnetic head incorporating the soft magnetic thin film has good recording and reproducing characteristics and high saturation magnetic characteristics.

7 Claims, 17 Drawing Sheets

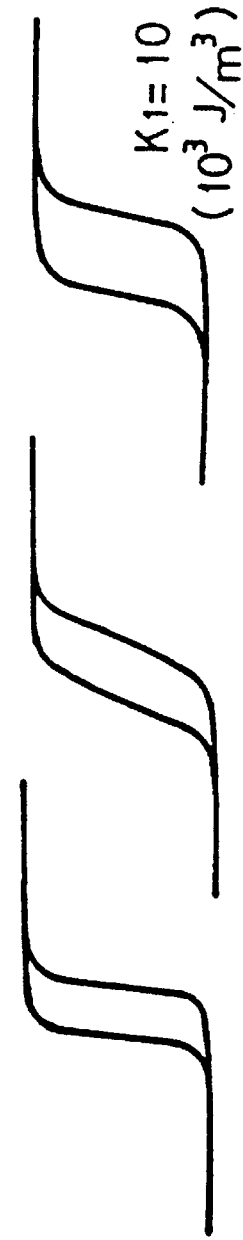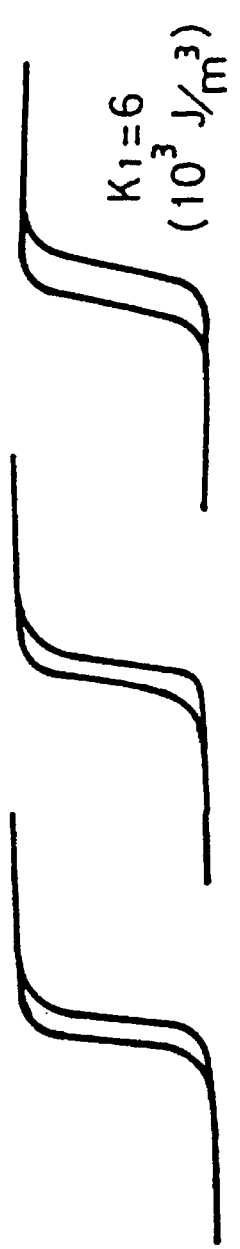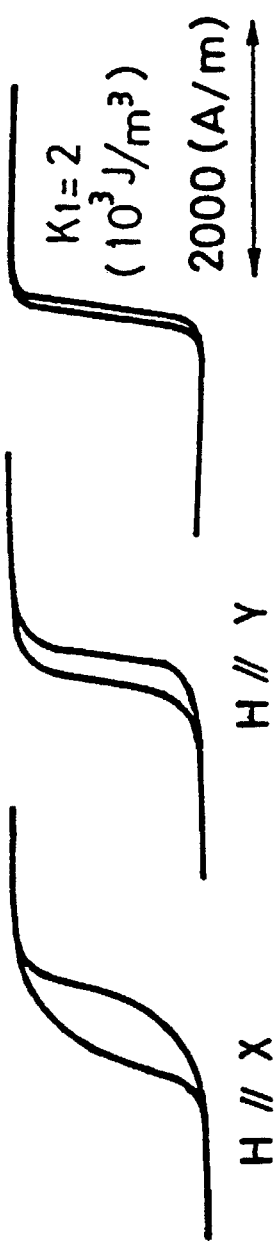
FIG.7A FIG.7D FIG.7G
FIG.7B FIG.7E FIG.7H
FIG.7C FIG.7F FIG.7I
$K_1 = 10$ ($10^3$ J/m$^3$)
$K_1 = 6$ ($10^3$ J/m$^3$)
$K_1 = 2$ ($10^3$ J/m$^3$)
2000 (A/m)
H // X
H // Y

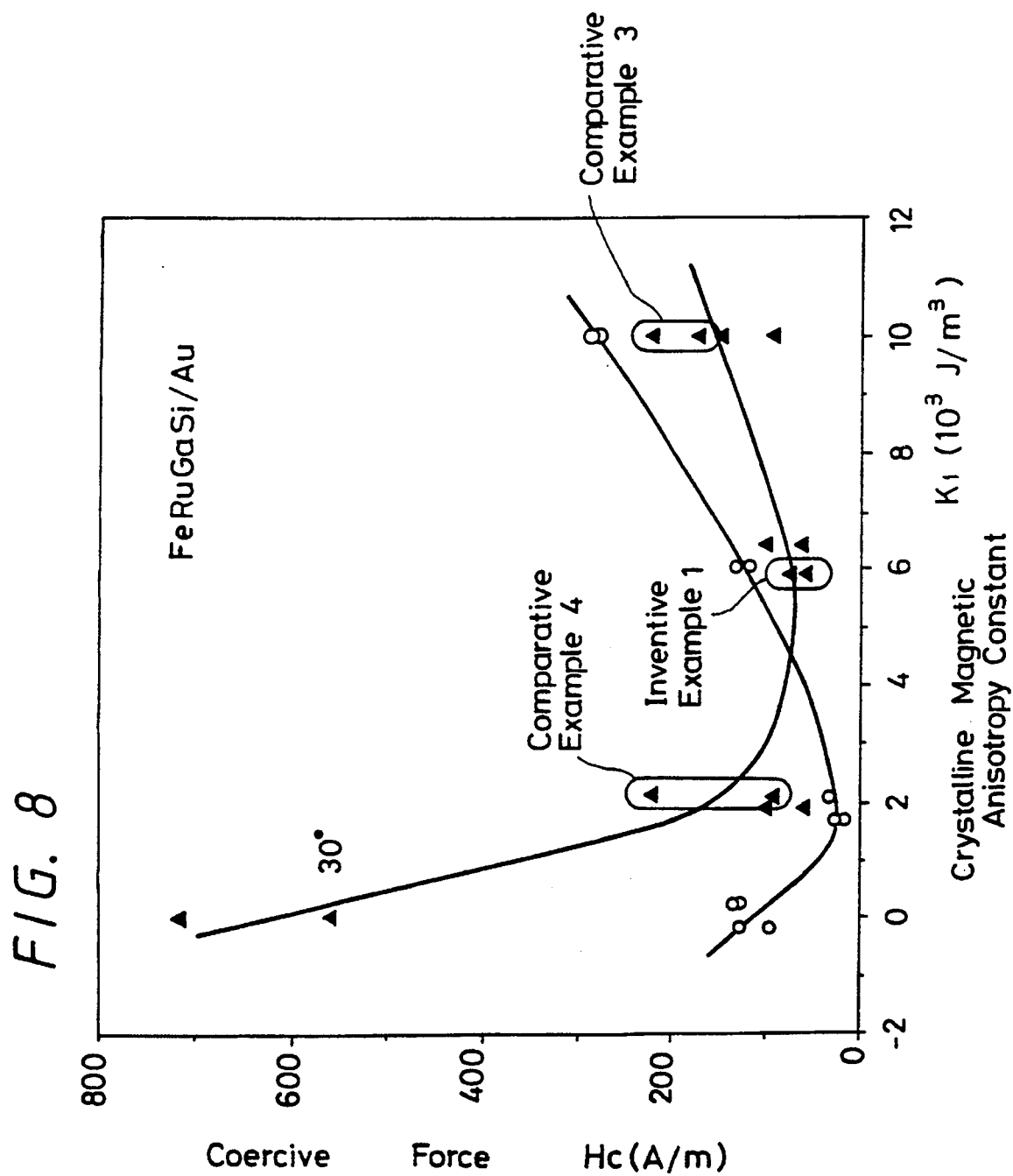

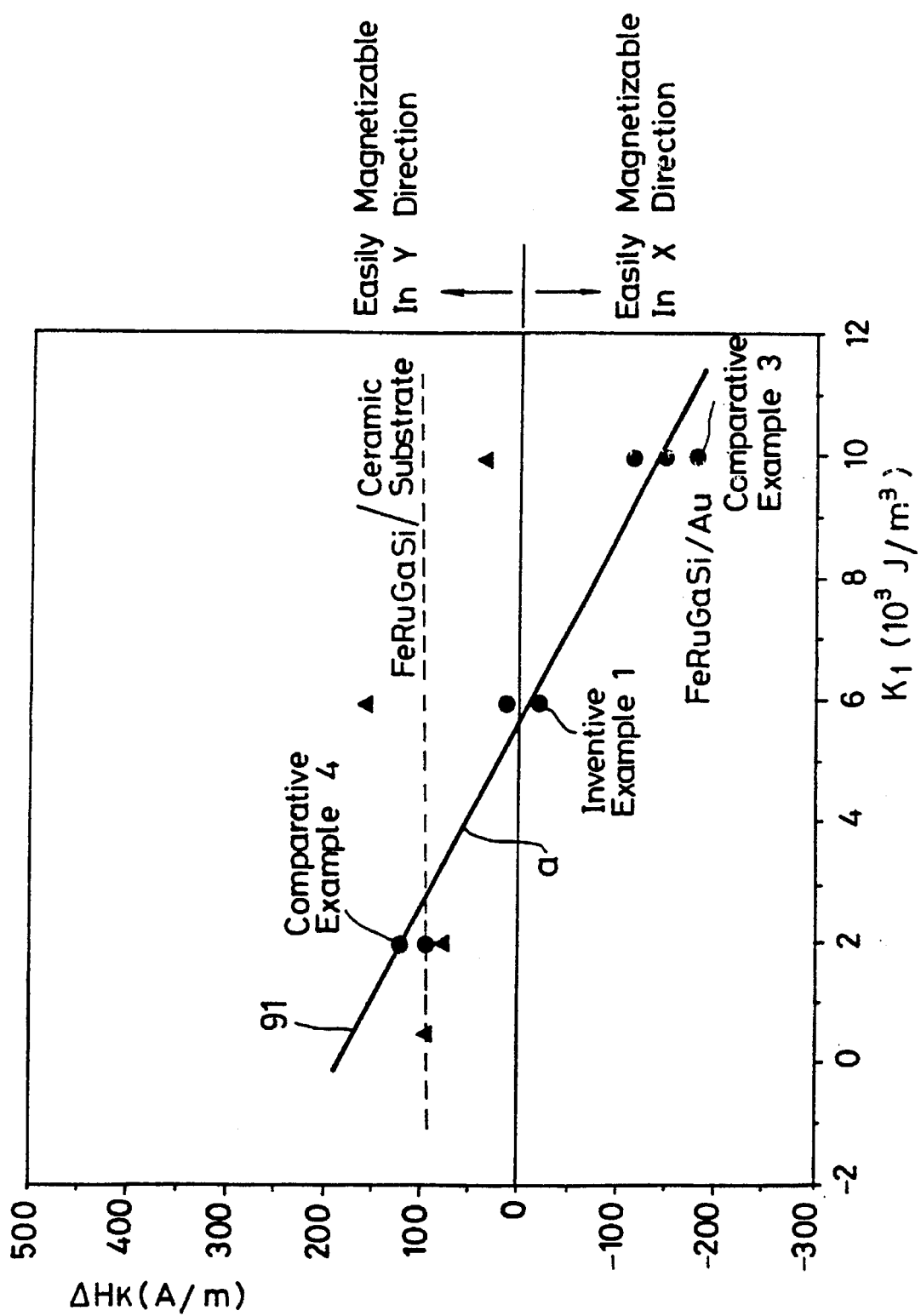

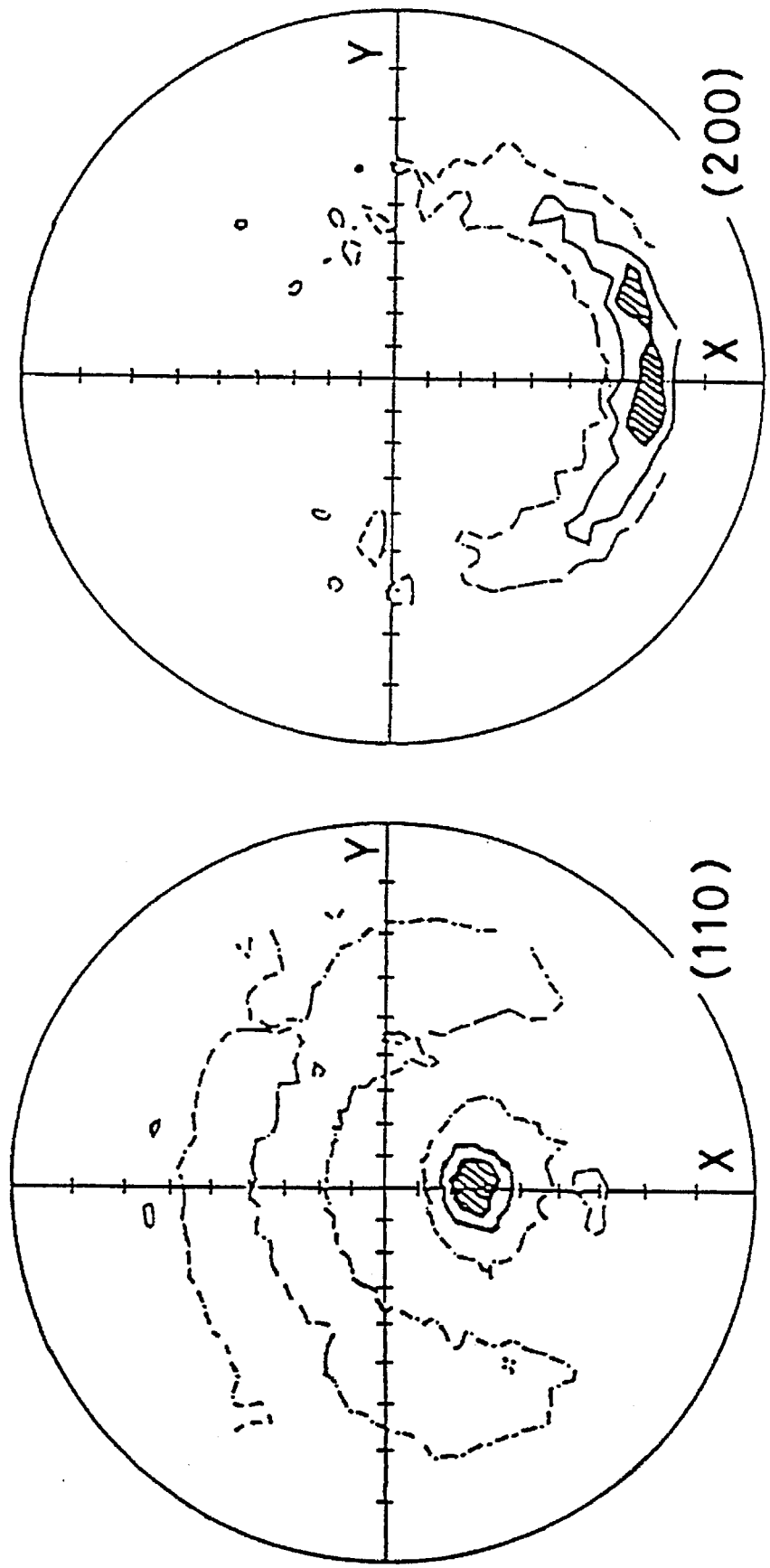

SOFT MAGNETIC THIN FILM

This is a continuation, of application Ser. No. 08/022,499, filed Feb. 25, 1993, now abandoned.

BACKGROUND OF THE INVENTION

1. Field of the Invention

The present invention relates to a soft magnetic thin film for use in a magnetic head for recording information on and reproducing information from a magnetic recording medium in an 8-mm VTR or a hard disk drive.

2. Description of the Prior Art

To meet demands for high-density magnetic recording with higher track densities and shorter wavelengths, it is necessary for magnetic heads to have soft magnetic thin films that are made of materials having high saturation flux density and high permeability.

Such soft magnetic thin film materials should preferably be amorphous alloys which can be manufactured by quenching a molten liquid and deposition from a vapor phase. Since amorphous alloys do not match the present magnetic head fabrication process due to lack of sufficient heat resistance, however, crystalline alloy materials have heretofore been used as soft magnetic thin film materials.

One material characteristic which is deeply involved in the reproduction characteristics of magnetic heads is permeability. The permeability is determined by how fast a spontaneous magnetic moment of ferromagnetic material responds to or follows an external magnetic field. If the spontaneous magnetic moment quickly follows a small leakage magnetic field from a recording medium, then the material has a high permeability, and the magnetic head has a high reproduction efficiency.

If the soft magnetic thin film of a magnetic head has such a property that its magnetic moment tends to be oriented only in a certain direction, i.e., if the soft magnetic thin film is magnetically anisotropic, then its spontaneous magnetic moment is prevented from following the direction of an external magnetic field, and the permeability of the soft magnetic thin film is low. Therefore, the soft magnetic thin films are required to have their magnetic anisotropy minimized.

Assuming that the angle between the spontaneous magnetization in the plane of a soft magnetic thin film and a reference direction is indicated by $\theta$, the total magnetization energy $Ktot(\theta)$ at the angle $\theta$ is given as the sum of the magnetization energy due to the crystalline magnetic anisotropy resulting from the crystalline structure of the soft magnetic material at the angle $\theta$, i.e., the crystalline magnetic anisotropy magnetization energy $Kc(\theta)$, the magnetization energy $Kst(\theta)$ due to the stress-induced magnetic anisotropy resulting from the exertion of a stress, and the magnetization energy $Ksh(\theta)$ due to the shape magnetic anisotropy depending on the shape of the crystal of the soft magnetic thin film, as indicated by the following equation (1):

$$Ktot(\theta)=Kc(\theta)+Kst(\theta)+Ksh(\theta) \qquad (1).$$

When the total magnetization energy $Ktot(\theta)$ is plotted with respect to the angle $\theta$, it is represented by a curve having maximum and minimum values as shown in FIG. 1 of the accompanying drawings. As the difference $|Ktot|$ between the maximum and minimum values of the curve, i.e., the maximum amplitude of the curve, is smaller, the permeability is higher and the coercive force is lower, making the soft magnetic thin film preferable for use in a magnetic head. The difference $|Ktot|$ will hereinafter referred to as a total magnetic anisotropy energy value. When the crystalline magnetic anisotropy magnetization energy $Kc(\theta)$, which can have both positive and negative values, is plotted with respect to the angle $\theta$, it is represented by a curve as shown in FIG. 2 of the accompanying drawings. The difference between the maximum and minimum values of the curve in FIG. 2 is represented by $|Kc|$, and will hereinafter referred to as a crystalline magnetic anisotropy energy value.

Generally, in the manufacture of a soft magnetic thin film with a small total magnetic anisotropy energy value $|Ktot|$, since the shape magnetic anisotropy cannot directly be measured, the composition of materials is selected such that the crystalline magnetic anisotropy and the stress-induced magnetic anisotropy will be as small as possible without taking the shape magnetic anisotropy into account.

In the case where a soft magnetic thin film is made of an alloy, the crystalline magnetic anisotropy thereof is given as the product of a constant (which is a quantity called $K_1$ in the unit of $(J/m^3)$ if the alloy is of a cubic system) determined by the composition of the alloy and a factor depending on the orientation distribution function of the specimen. The composition of the alloy is selected such that $|K_1|$ will be smaller. The stress-induced magnetic anisotropy is proportional to the product $\lambda \times \sigma$ where $\lambda$ is the magnetorestriction and $\sigma$ is the stress. If the soft magnetic thin film is formed by sputtering, then the stress $\sigma$ is frequently of a large value. Even if conditions are established to suppress the stress $\sigma$, it is difficult to reduce the stress $\sigma$ with high reproducibility owing to a slight deviation of the conditions. Therefore, the composition of the alloy is selected such that the magnetorestriction $\lambda$ depending on the alloy composition will be smaller.

As described above, in order to reduce the total magnetic anisotropy energy value $|Ktot|$ of a soft magnetic thin film, it has heretofore been customary to select a composition with a smaller magnetorestriction $\lambda$ and a smaller crystalline magnetic anisotropy constant $K_1$. Alloy materials that satisfy such conditions are practically only an FeAlSi alloy, i.e., Sendust, and an FeRuGaSi alloy (Sofmax: commercial name).

However, even when a soft magnetic thin film is made of an FeAlSi alloy or an FeRuGaSi alloy whose crystalline magnetic anisotropy constant $K_1$ and magnetorestriction $\lambda$ are 0, the total magnetic anisotropy energy value $|Ktot|$ is not sufficiently small. This is because the shape magnetic anisotropy, which has not been taken into account heretofore, i.e., the third term $Ksh(\theta)$ of the equation (1), is a large factor.

Specifically, even when only the crystalline magnetic anisotropy energy value $|Kc|$ is reduced in an attempt to reduce the total magnetic anisotropy energy value $|Ktot|$, the total magnetic anisotropy energy value $|Ktot|$ is not necessarily reduced under the influence of a large shape magnetic anisotropy that is produced by the columnar crystalline structure of the soft magnetic thin film.

Soft magnetic thin films for use in magnetic heads are fabricated by depositing an alloy, used as a target, on a substrate by sputtering or vacuum evaporation.

According to one fabrication process, metallic particles are directed perpendicularly to the substrate surface so as to be deposited thereon. However, in the manufacture of recently popular magnetic heads with magnetic gap surfaces covered with soft magnetic thin films, metallic particles are directed and deposited on a thin-film-forming surface at an angle to the direction normal to the thin-film-forming surface. Such a practice is referred to as oblique deposition or tilted substrate orientation.

A soft magnetic thin film made of a crystalline alloy that is obliquely deposited by sputtering or vacuum evaporation has its total magnetic anisotropy energy value |Ktot| largely increased by the shape magnetic anisotropy.

The reasons for such a large increase in the total magnetic anisotropy energy value |Ktot| are as follows: The materials of the soft magnetic thin film that is obliquely deposited are not uniformly packed, but have gaps in the crystal boundary and are of a columnar structure. When the soft magnetic material with gaps which is composed of columns separated by nonmagnetic regions such as oxide films is magnetized, it is easily magnetized in its longitudinal direction. Therefore, a large shape magnetic anisotropy occurs due to the shape (e.g., rod or plate shape) of the columnar crystal and the angle at which the columnar crystal is tilted.

When a soft magnetic thin film is formed by oblique deposition, the stress σ developed in the thin film may sometimes be extremely large. If an extremely large stress σ is developed, then it causes a large stress-induced magnetic anisotropy |Kst| to be produced by combination with a slight magnetostriction λ, with the result that the total magnetic anisotropy energy value |Ktot| is not reduced.

OBJECTS AND SUMMARY OF THE INVENTION

It is therefore an object of the present invention to provide a soft magnetic thin film which is free of the conventional problems relative to the total magnetic anisotropy.

According to the present invention, a soft magnetic thin film which is fabricated by oblique deposition has crystalline magnetic anisotropy whose sign and magnitude are selected to cancel out the shape magnetic anisotropy depending on an inclined columnar crystalline structure and the stress-induced magnetic anisotropy.

Specifically, a soft magnetic thin film according to the present invention is arranged to satisfy the following relationship:

$$|Ktot|<|Kc|$$

where magnetization energy required to magnetize the soft magnetic thin film in any direction in the plane thereof is referred to as total magnetization energy, |Ktot| is the difference between the maximum and minimum values of the total magnetization energy in every direction in the plane, and |Kc| is the difference between the maximum and minimum values of the magnetization energy in every direction in the plane due to crystalline magnetic anisotropy.

A magnetic head according to the present invention incorporates the soft magnetic thin film described above.

The soft magnetic thin film has a reduced total magnetic anisotropy. The magnetic head has good recording and reproducing characteristics and high saturation magnetic characteristics.

The above and other objects, features, and advantages of the present invention will become apparent from the following description of illustrative embodiments thereof to be read in conjunction with the accompanying drawings, in which like reference numerals represent the same or similar objects.

BRIEF DESCRIPTION OF THE DRAWINGS

FIGS. 7A, 7B, 7C, 7D, 7E, 7F, 7G, 7H, and 7I are diagrams showing magnetization curves;

FIG. 8 is a diagram showing the relationship between the coercive force Hc and the crystalline magnetic anisotropy constant $K_1$;

FIG. 9 is a diagram showing the relationship between the anisotropic magnetic field Hk and the crystalline magnetic anisotropy constant $K_1$;

FIGS. 11A and 11B are polar diagrams showing a crystal direction;

DETAILED DESCRIPTION OF THE PREFERRED EMBODIMENTS

Figure 3:
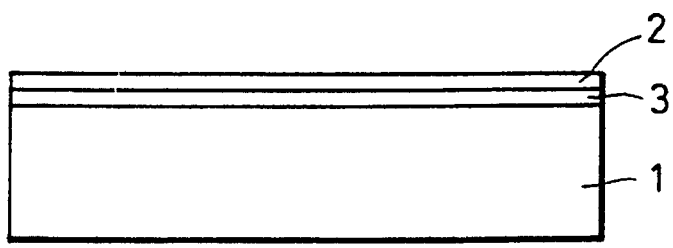
FIG. 3 is a cross-sectional view of a soft magnetic thin film according to the present invention.

As shown in FIG. 3, a soft magnetic thin film 2 according to the present invention is disposed on a base layer 3 on a substrate 1.

It is assumed that the magnetization energy required to magnetize the soft magnetic thin film 2 in any direction in the plane thereof is referred to as total magnetization energy, the difference (hereinafter referred to as a total magnetic anisotropy energy value) between the maximum and minimum values of the total magnetization energy in every direction in the plane is represented by |Ktot|, and the difference (hereinafter referred to as a crystalline magnetic anisotropy energy value) between the maximum and minimum values of the magnetization energy in every direction in the plane due to the crystalline magnetic anisotropy is represented by |Kc|. The soft magnetic thin film 2 is arranged to satisfy the following relationship:

$$|Ktot|<|Kc| \quad (2).$$

The total magnetic anisotropy energy value |Ktot| and the crystalline magnetic anisotropy energy value |Kc| may be selected to satisfy the following relationship:

$$|Ktot|<50<|Kc|(J/m^3) \quad (3).$$

The soft magnetic thin film 2 may be made of an FeRuGaSi alloy.

The sum of Fe and Ru in the FeRuGaSi alloy may have a composition of 75 atomic % or more.

The soft magnetic thin film 2 may be made of an FeAlSi alloy.

The crystalline magnetic anisotropy constant $K_1$ of the soft magnetic thin film 2 in a cubic system may be in the following range:

$$3<K_1<10(10^3 J/m^3) \quad (4).$$

The base layer 3 may be made of Au or Pt.

The soft magnetic thin film 2 may be used in a magnetic head.

For example, the soft magnetic thin film 2 may be used as a thin film core in a magnetic head, thus providing a thin-film magnetic head.

In a magnetic head having a magnetic gap, the magnetic gap may be defined by magnetic-gap-forming surfaces each comprising the soft magnetic thin film 2.

The above formulas (2), (3), and (4) may be satisfied by selecting the composition of the alloy, the angle at which metallic particles are deposited on the substrate 1, the speed at which the substrate 1 rotates, the rate at which metallic particles are deposited on the substrate 1, and other deposition conditions.

The total magnetic anisotropy and crystalline magnetic anisotropy of the soft magnetic thin film 2 can be evaluated in the usual manner. For example, the total magnetic anisotropy of the soft magnetic thin film 2 may be measured by the ordinary torque method (see *MAGNETIC THIN FILM ENGINEERING*, edited by Iida, Magnetic Engineering Lecture No. 5, Maruzen, 1977).

The crystalline magnetic anisotropy may be evaluated by plotting a polar diagram from X-ray diffraction data of a thin film specimen whose gradient is varied, determining an ODF (Orientation Distribution Function) based on the polar diagram, and calculating the crystalline magnetic anisotropy energy based on the ODF (see *TEXTURE*, edited by Shinichi Nagao, 1984, *PHYSICS OF FERROMAGNETIC MATERIALS*, edited by Soushin Chikasumi, Shoukabo, *TEXTURE*, 1, 117 (1972), W. B. Hutechinson et al.).

As indicated by the inequality (2) above, the crystalline magnetic anisotropy energy value |Kc| is selected to be larger than the total magnetic anisotropy energy value |Ktot|.

Stated otherwise, when the crystalline magnetic anisotropy energy value a |Kc|, which is one component of the magnetic anisotropy, is selected to be larger than the total magnetic anisotropy energy value |Ktot|, the crystalline magnetic anisotropy, the shape magnetic anisotropy, and the stress-induced magnetic anisotropy cancel out each other, resulting in a reduced total magnetic anisotropy energy value |Ktot|. Thus, if a small total magnetic anisotropy energy value |Ktot| which satisfy the inequality (2) is obtained, then a preferred soft magnetic thin film can be produced.

If a soft magnetic alloy such as an FeRuGaSi alloy or an FeAlSi alloy, which has heretofore been preferred for its composition, is obliquely deposited, then the total magnetic anisotropy energy value |Ktot| may reach 200 (J/m³).

According to the present invention, however, since the crystalline magnetic anisotropy energy value |Kc| is increased to cancel out the shape magnetic anisotropy based on the columnar crystalline structure formed by oblique deposition and the stress-induced magnetic anisotropy, the total magnetic anisotropy can be reduced even if the shape magnetic anisotropy is large to a certain extent.

The soft magnetic thin film 2 shown in FIG. 3 is formed on the substrate 1 by physically applying metallic particles, by way of sputtering, evaporation, or the like, from a target of a BCC FeRuGaSi or FeAlSi alloy or an FCC Fe—Ni alloy, e.g., 80 atomic % of Fe and Ni of remainder: Permalloy).

Figure 4:
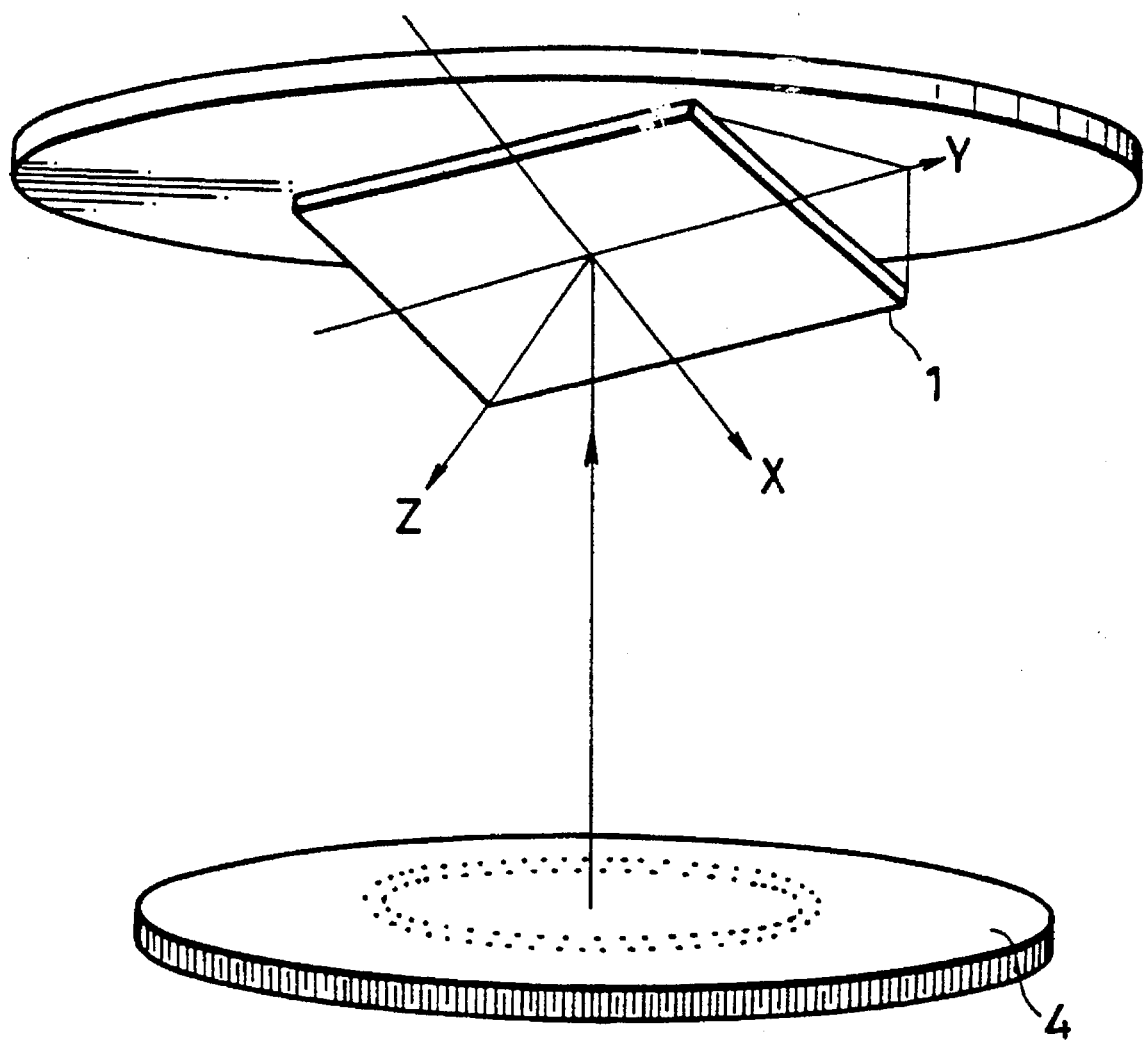
FIG. 4 is a perspective view showing the manner in which metallic particles are applied to and deposited on a substrate to form a thin film of columnar structure by way of sputtering.

More specifically, as shown in FIG. 4, metallic particles are sputtered from a target 4, which is of the material of the soft magnetic thin film, toward a surface, in an X-Y plane, of the substrate 1 on which the soft magnetic thin film is to be formed (hereinafter referred to as a substrate surface) at an angle inclined to a line Z normal to the substrate surface.

A soft magnetic thin film of an FeRuGaSi alloy (Sofmax) was formed on a glass ceramic substrate (PEG-3130 manufactured by HOYA Corporation) whose coefficient of thermal expansion is $1.3 \times 10^{-5}$ K$^{-1}$ under the following conditions:

Specimen forming conditions:
  Initial vacuum: $9.9 \times 10^{-5}$ Pa
  Applied power: RF 300 W
  Deposition rate: 1.7 nm/sec.
  Ar gas pressure: $4.5 \times 10^{-1}$ Pa
  Film thickness: 2.36 μm
  Angle of inclination of the substrate surface (Oblique deposition: the angle of the substrate surface with respect to a plane parallel to the target surface): 30°

Heat treatment after the deposition:
  Held in vacuum at 550° C. for one hour.

Figure 1:
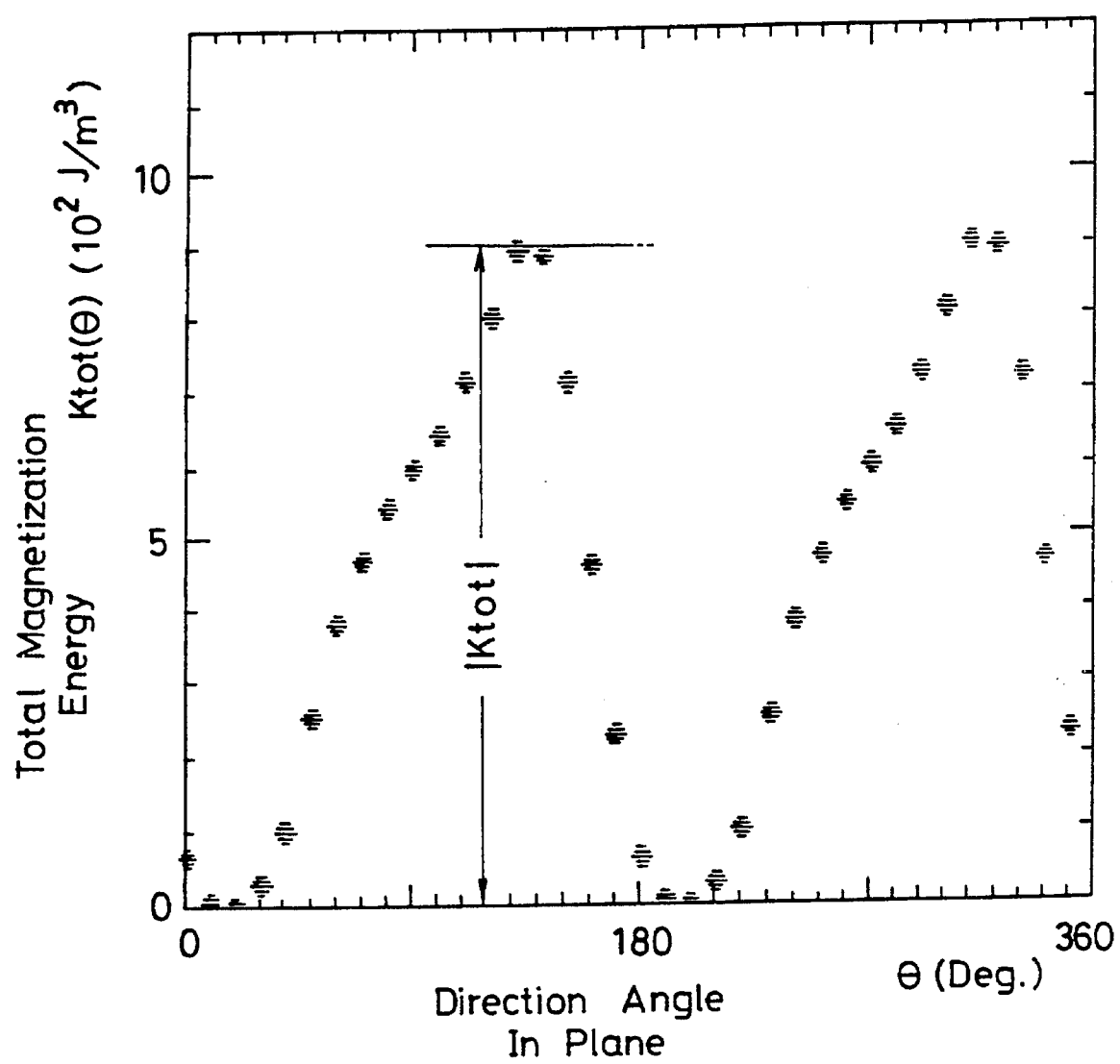
FIG. 1 is a diagram showing the relationship between the total magnetization energy Ktot (θ) based on a total magnetic anisotropy determined by torque measurements and the plane-direction angle θ.

With respect to the specimen thus produced, the relationship between the total magnetization energy Ktot (θ) based on a total magnetic anisotropy determined by torque measurements and the plane-direction angle θ is shown in FIG. 1, and the relationship between the crystalline magnetic anisotropy magnetization energy Kc (θ) due to a crystalline magnetic anisotropy calculated on the basis of an ODF analysis and the plane-direction angle θ is shown in FIG. 1. The crystalline magnetic anisotropy constant $K_1$ of Sofmax used in the evaluation of the crystalline magnetic anisotropy has a value of $+1.4 \times 10^3$ (J/m³).

Figure 2:
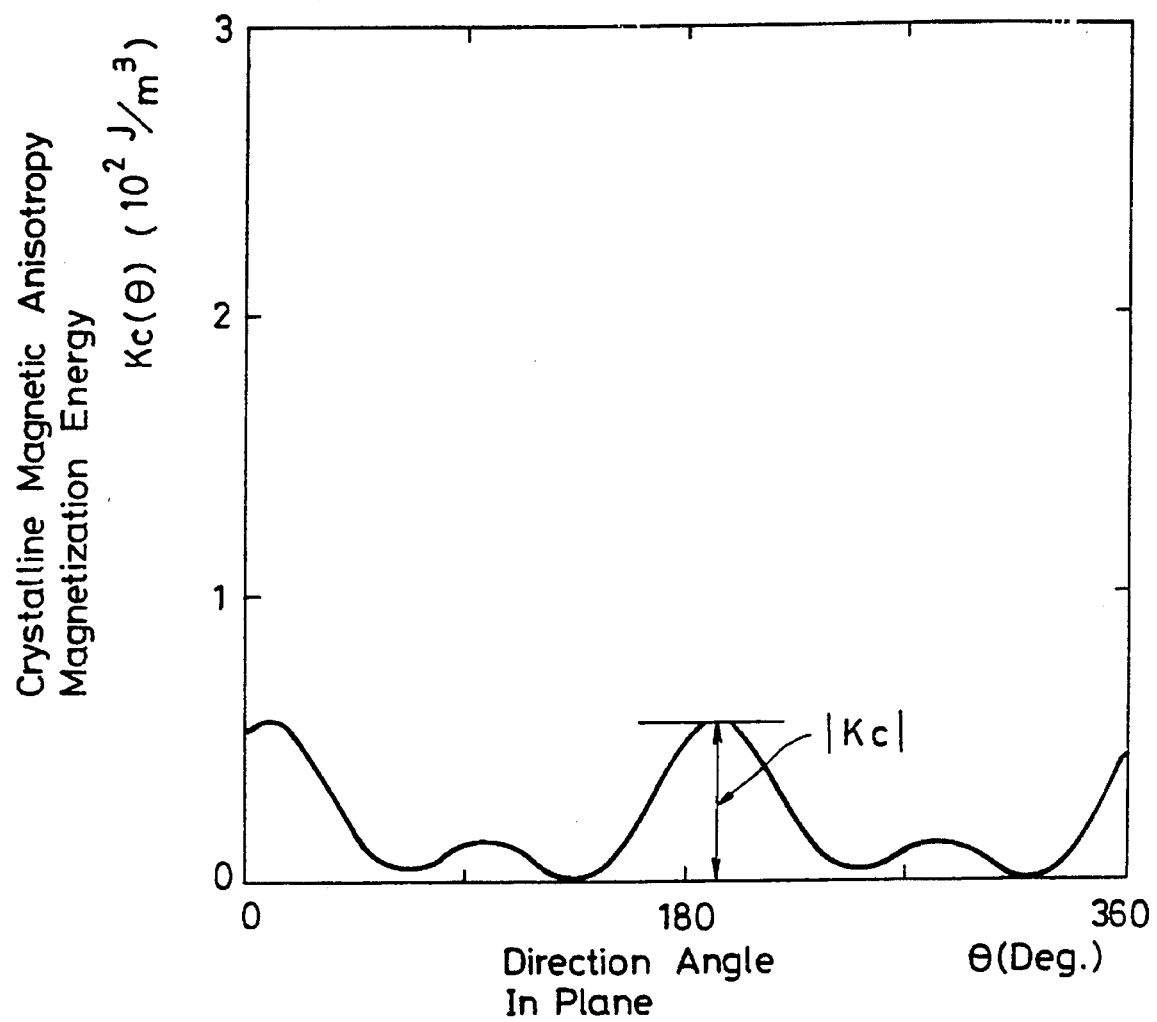
FIG. 2 is a diagram showing the relationship between the crystalline magnetic anisotropy magnetization energy Kc (θ) due to a crystalline magnetic anisotropy calculated on the basis of an ODF analysis and the plane-direction angle θ.

Comparison of FIGS. 1 and 2 indicates that total magnetic anisotropy is several times larger than the crystalline magnetic anisotropy, and that the easy direction of magnetization (i.e., the angle at which the curve shown in FIG. 2 is of the minimum value) that is predicted from the crystalline magnetic anisotropy and the easy direction of magnetization (i.e., the angle at which the curve shown in FIG. 1 is of the minimum value) that is actually observed are angularly spaced about 90°.

This fact shows that because the temperature at which the soft magnetic thin film is not sufficiently high, the columnar structure remains, producing shape magnetic anisotropy, and the grain boundary of the columnar structure stores residual stresses which give rise to stress-induced magnetic anisotropy. Therefore, the total magnetic anisotropy greater than the crystalline magnetic anisotropy is observed.

Inventive Example 1

Using the sputtering arrangement shown in FIG. 4, the substrate surface was tilted 30° to the target 4, and a magnetic thin film of FeRuGaSi was sputtered on the substrate surface under the same conditions as described above.

As shown in FIG. 3, the base layer 3 was first formed on the substrate 1 for controlling the direction of the magnetic thin film, and then the soft magnetic thin film 2 was formed on the base layer 3. The base layer 3 was of a double-layer structure including a Cr layer having a thickness of 9 nm which was sputtered on the substrate 1 for better adhesion and an Au layer having a thickness of 180 nm which was sputtered on the Cr layer. The soft magnetic thin film 2 was then deposited on the base layer 3 to a thickness of 1.6 μm.

Table 1 below indicates the composition, the crystalline magnetic anisotropy constant $K_1$, the saturation flux density Bs, the film structure, the thickness, the substrate surface inclination, the coercive forces Hc(X), Hc(Y) in the X and Y directions, and the difference ΔHk between anisotropic magnetic fields Hk(X), Hk(Y) in the X and Y directions, of the soft magnetic thin film 2 thus formed and soft magnetic thin films according to Comparative Examples 1 through 4.

In Inventive Example 1, the sum of Fe and Ru in the FeRuGaSi alloy has a composition of 78.5 atomic %. However, if the sum of Fe and Ru in the FeRuGaSi alloy has a composition of 75 atomic % or higher, then a soft magnetic thin film with a high Bs can be produced. The required Bs and soft magnetic characteristics will not be impaired by adding 5 atomic % of Cu, Cr, or the like to the FeRuGaSi alloy.

FIGS. 5A, 5D, FIGS. 5B, 5E, and FIGS. 5C, 5F show magnetization curves in the X and Y directions for the specimens according to Inventive Example 1 and Comparative Examples 1, 2, respectively, with $K_1=6\times10^3$ (J/m$^3$) and λ~0.

It can be seen from comparison of FIGS. 5A, 5D and 5B, 5E that the specimen according to Comparative Example 1 with no Au base layer 3 and the substrate 1 tilted at 30° has a large anisotropic magnetic field in the X direction and a magnetic anisotropy generated in the plane of the thin film, resulting in poor soft magnetic characteristics.

Figure 5A:
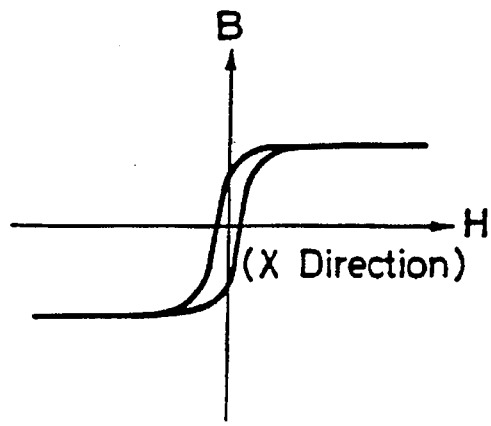
FIGS. 5A, 5B, 5C, 5D, 5E, and 5F are diagrams showing magnetization curves.
Figure 5B:
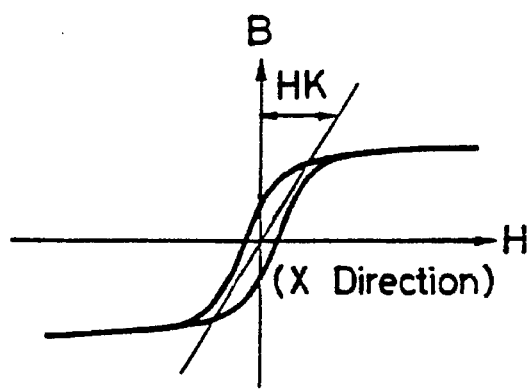
Figure 5C:
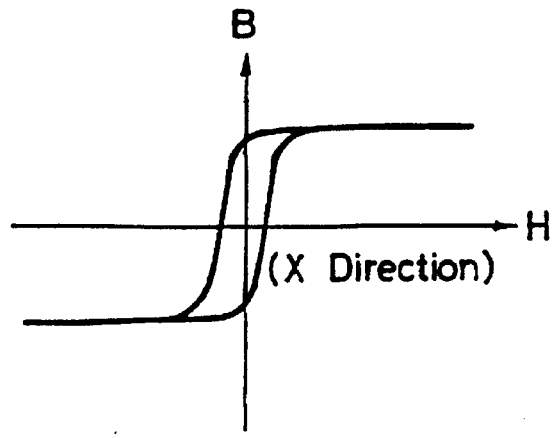
Figure 5D:
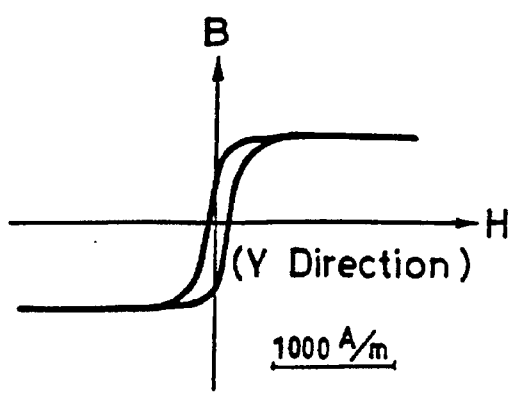
Figure 5E:
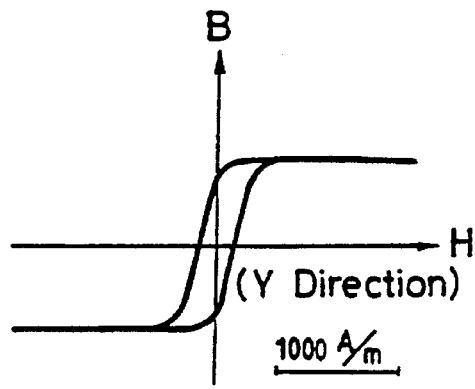
Figure 5F:
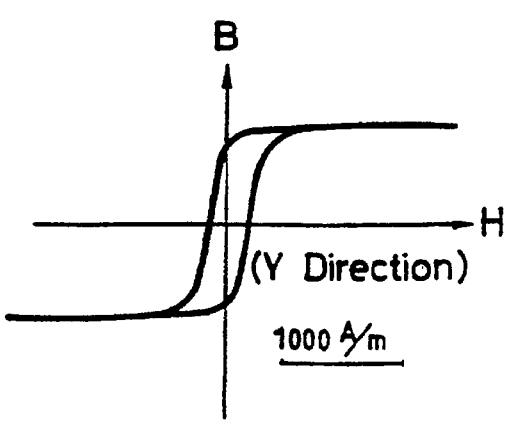
Figure 6A:
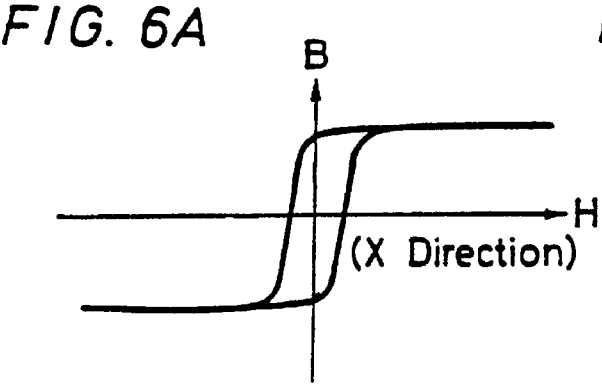
FIGS. 6A, 6B, 6C, 6D, 6E, and 6F are diagrams showing magnetization curves.
Figure 6D:
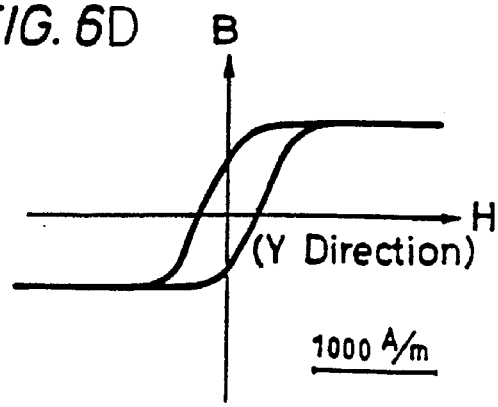
Figure 6B:
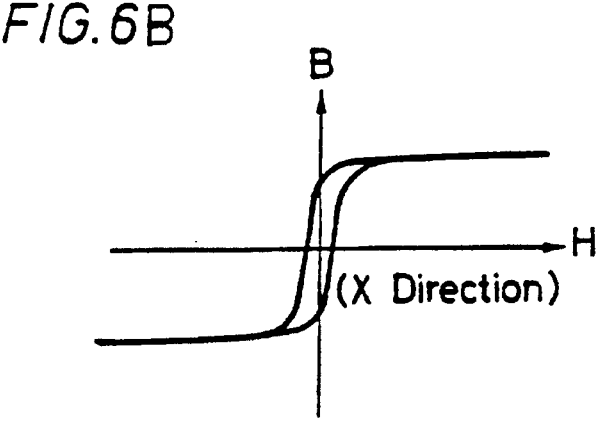
Figure 6E:
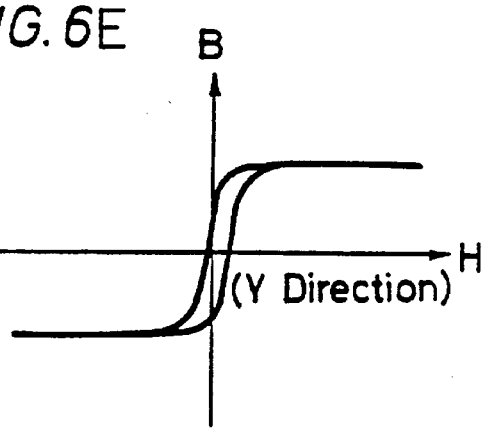
Figure 6C:
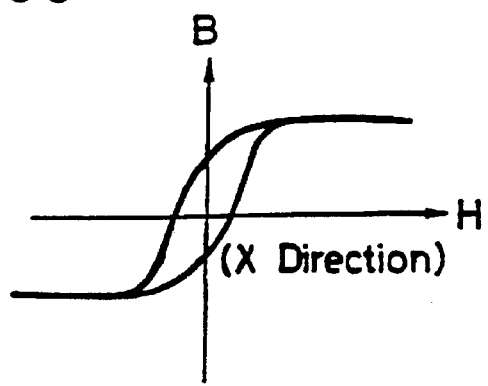
Figure 6F:
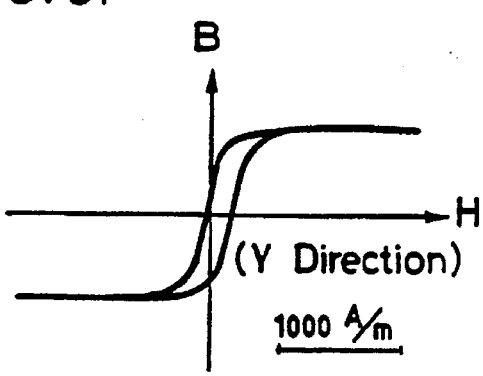

In Comparative Example 3 shown in FIGS. 5C, 5F, the thin film is deposited on the substrate 1 by way of perpendicular deposition rather than oblique deposition, i.e., with

TABLE 1

| Specimen | Composition (at %) | | | | $K_1$ ($10^3$J/m$^3$) | Bs (T) | Film structure and thickness | | | Inclination | Hc (X), Hc (Y) (A/m) | ΔHk (A/m) |
| --- | --- | --- | --- | --- | --- | --- | --- | --- | --- | --- | --- | --- |
| | Fe | Ru | Ga | Si | | | | | | | | |
| Inventive Example 1 | 70.5 | 8 | 5.5 | 16 | 6 | 1.20 | SMX 1.6 μm | Au 180 nm | Cr 9 nm | 30° | 80, 64 | −16 |
| Comparative Example 1 | " | " | " | " | 6 | 1.20 | SMX 1.83 μm | | | 30° | 104, 104 | 160 |
| Comparative Example 2 | " | " | " | " | 6 | 1.20 | SMX 1.6 μm | Au 200 nm | Cr 10 nm | 0° | 136, 120 | 28 |
| Comparative Example 3 | 74 | 8 | 4 | 14 | 10 | 1.35 | SMX 1.6 μm | Au 180 nm | Cr 9 nm | 30° | 176, 224 | −176 |
| Comparative Example 4 | 68 | 8 | 7 | 17 | 2 | 1.06 | SMX 1.6 μm | Au 180 nm | Cr 9 nm | 30° | 224, 96 | 120 |

SMX: Sofmax (FeRuGaSi alloy)
Each film composition is selected with the magnetorestriction λs ~ 0.

Target compositions used in the specimens with different $K_1$ values are shown in Table 2 below.

TABLE 2

| Specimen | Target composition | | | |
| --- | --- | --- | --- | --- |
| | Fe | Ru | Ga (at %) | Si |
| $K_1 = 10$ | 72 | 8 | 8 | 12 |
| $K_1 = 6$ | 69 | 8 | 10 | 13 |
| $K_1 = 2$ | 66 | 8 | 12 | 14 |

The soft magnetic thin film 2 according to Inventive Example 1 exhibited a small coercive force, i.e., Hc=64~80 (A/m), and a small magnetic anisotropy, i.e., ΔHk=−16 (A/m), resulting in good soft magnetic characteristics, though it falls outside the conventional soft magnetic composition range for the same alloy system as indicated by the crystalline magnetic anisotropy constant $K_1=6\times10^3$(J/m$^3$).

Since the composition of the soft magnetic thin film 2 according to Inventive Example 1 is Fe-rich, the saturation flux density Bs which is 1.2 (T) is twenty percent higher than that of the conventional best composition for the same alloy system.

the substrate 1 not tilted. In Comparative Example 1 shown in FIGS. 5B, 5E, the thin film is deposited on the substrate 1 by way of oblique deposition. As well known in the art, the soft magnetic thin film deposited by perpendicular deposition has a small ΔHk value and a small magnetic anisotropy in the plane of the thin film. Comparison between Comparative Examples 1 and 2 shows that the coercive forces Hc(X), Hc(Y) of the soft magnetic thin film deposited by perpendicular deposition are 1.5~2 times larger than those of the soft magnetic thin film according to Inventive Example 1, resulting in poor soft magnetic characteristics.

With the above composition, the combination of the oblique deposition and the Au base layer is better than the perpendicular deposition that has heretofore been considered to obtain good soft magnetic characteristics.

FIGS. 6A~6C, 6D~6F show magnetization curves for different $K_1$ values that are achieved by varying the compositions with the substrate surface tilted at 30° and the Au base layer 3 included in Table 1 above. FIGS. 6A, 6B, FIGS. 6B, 6E, and FIGS. 6C, 6F show magnetization curves in the X and Y directions for the specimens according to Comparative Example 3, Inventive Example 1, and Comparative Example 4, with $K_1=10$ ($10^3$/m$^3$), $K_1=6$ ($10^3$/m$^3$), $K_1=2$ ($10^3$/m$^3$), respectively.

Normally, it is considered that since the smaller the absolute value of the crystalline magnetic anisotropy constant $K_1$, the smaller the crystalline magnetic anisotropy of the specimen in proportion thereto, better soft magnetic characteristics are obtained with smaller $K_1$.

According to the magnetization curves in both the X and Y directions shown in FIGS. 6A–6C, 6D–6F, however, those with smaller coercive forces Hc and smaller anisotropic magnetic fields Hk have the crystalline magnetic anisotropy constant $K_1=6$ ($10^3/m^3$) rather than the crystalline magnetic anisotropy constant $K_1=2$ ($10^3/m^3$). This result is contrary to the conventional knowledge.

FIGS. 7G, 7H, 7I show magnetization curves for the specimens whose the substrate surfaces are held horizontally with $K_1=10$ ($10^3/m^3$), $K_1=6$ ($10^3/m^3$), $K_1=2$ ($10^3/m^3$), respectively. These magnetization curves are compared with those in FIGS. 6A–6C, 6D–6F that are shown as FIGS. 7A–7C, 7D–7F. With the substrate surfaces held horizontally, much better soft magnetic characteristics are obtained with smaller $K_1$ values.

Changes in the coercive force Hc with respect to $K_1$ with the substrate surfaces held horizontally and tilted are shown in FIG. 8. As shown in FIG. 8, the soft magnetic thin films with the substrate surfaces held horizontally and tilted, respectively, have apparently different $K_1$ values at the minimum values of Hc, i.e., for best soft magnetic characteristics.

In FIG. 8, each of the symbols ▲ indicates a measured value for the substrate surface tilted 30°, and each of the symbols o indicates a measured value for the substrate surface held horizontally. All the specimens that were measured include an Au base layer.

It can be seen from FIG. 8 that when the substrate surface is tilted, a range for best soft magnetic characteristics, i.e., smaller Hc values, is shifted toward larger $K_1$ values.

Alloys containing Fe as a major component, such as an FeAlSi alloy or an FeRuGaSi alloy, tend to have a larger crystalline magnetic anisotropy constant $K_1$ and a higher saturation flux density Bs for an Fe-rich composition (see Journal of Magnetism and Magnetic Materials 96 (1991), p. 230–236). If the crystalline magnetic anisotropy is to be reduced in a direction to increase the crystalline magnetic anisotropy constant $K_1$, then the saturation flux density Bs is also increased when that composition is selected.

It can be understood that the "best composition" in a certain composition system is not absolutely universal irrespective of the process of fabricating films.

Therefore, if a special deposition process such as oblique sputtering is employed to meet a manufacturing requirement such as a magnetic head mass-production process, then it is possible to manufacture magnetic heads that meet the manufacturing requirement and exhibit good characteristics by selecting a composition matching the deposition process.

FIG. 9 shows the dependency on $K_1$ of the difference $\Delta Hk = Hk(X) - Hk(Y)$, as the measure of the plane magnetic anisotropy of the specimens, between the anisotropic magnetic fields Hk in the X and Y directions which are read from the magnetization curves described above.

In FIG. 9, each of the symbols ▲ indicates a value plotted when the film is deposited directly on the ceramic substrate. Each plotted value does not depend on $K_1$, and is a positive value of about 100 (A/m). This indicates that the film is easily magnetizable in the Y direction that is perpendicular to the X-Z plane, i.e., the surface of the substrate to which the atoms are applied.

In FIG. 9, each of the symbols ● indicates a value plotted when the film is deposited on the Au base layer. As indicated by a solid-line curve 91 drawn along the symbols ●, the difference $\Delta Hk$ decreases monotonously as $K_1$ increases, and the easy direction of magnetization varies from the X direction to the Y direction. The specimen whose difference $\Delta Hk$ goes across the line $|\Delta Hk|=0$ with the smallest plane magnetic anisotropy is that with $K_1=6\times10^3(J/m^3)$.

The crystal directions of the specimens were checked by the polar diagrams of FIGS. 10A, 10B through 13A, 13B for the purpose of determining the cause of the above anisotropic change. In each of the polar diagrams, broken lines represent a maximum X-ray diffraction intensity of 50%, solid lines represent a maximum X-ray diffraction intensity of 67%, and hatched-line areas represent a maximum X-ray diffraction intensity of 80%. FIGS. 10A, 11A, 12A, and 13A show crystal directions in a (110) crystal face, and FIGS. 10B, 11B, 12B, and 13B show crystal directions in a (200) crystal face. FIGS. 10A, 10B and 11A, 11B illustrate crystal directions observed when FeRuGaSi was deposited directly on polycrystalline ceramic substrates held horizontally and tilted 30°, respectively. FIGS. 12A, 12B and 13A, 13B illustrate crystal directions observed when FeRuGaSi was deposited on Au base layers on ceramic substrates held horizontally and tilted 30°, respectively.

Comparison between FIGS. 10A, 10B and 11A, 11B shows that when no Au base layer is present, the (200) pole concentrates in the X-Z plane in an angle α of elevation ~20° depending on the inclination of the substrate.

Figure 10B:
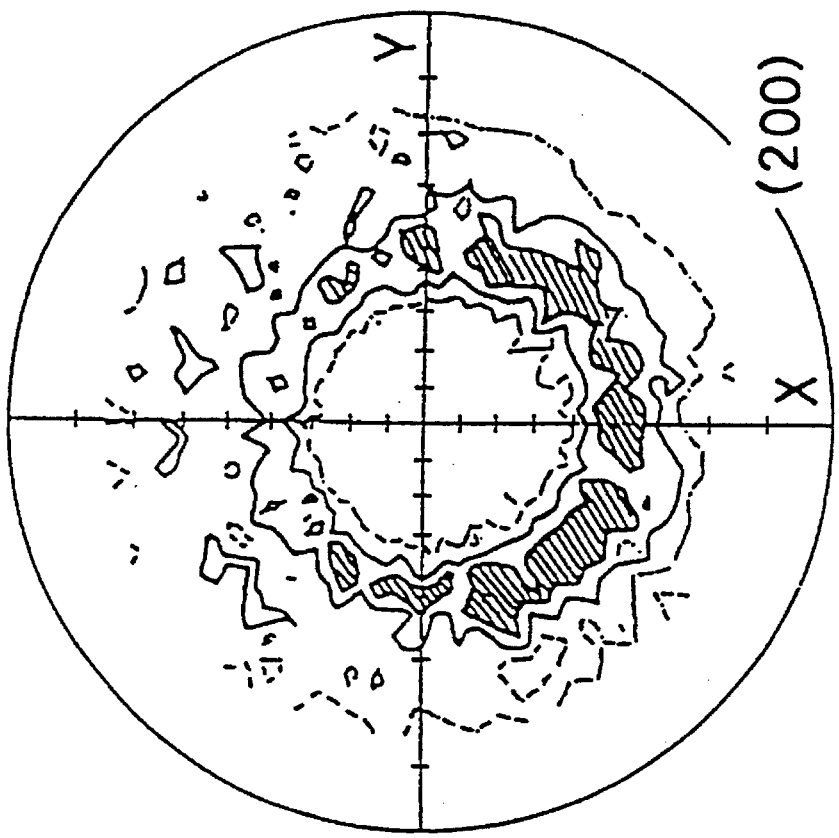
FIGS. 10A and 10B are polar diagrams showing a crystal direction.
Figure 10A:
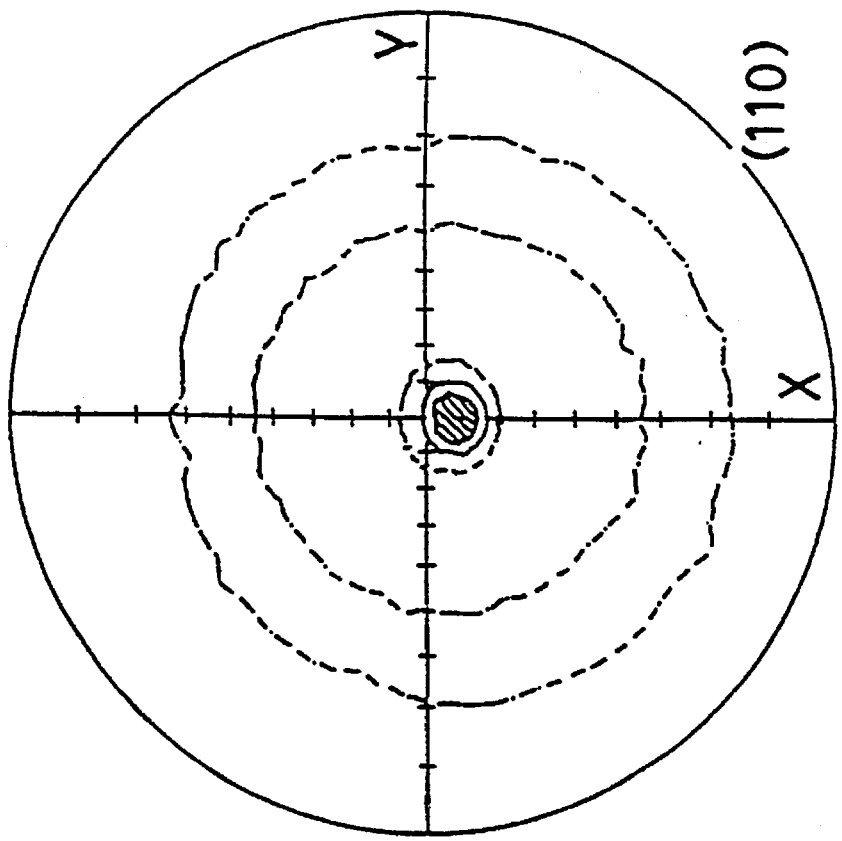
Figure 12A:
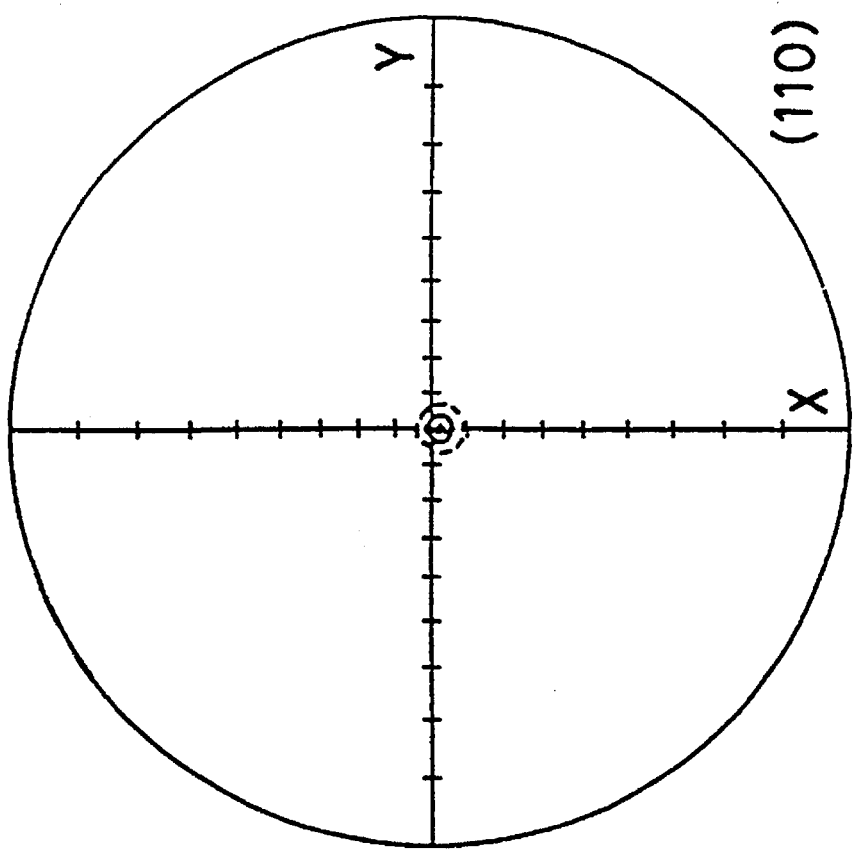
FIGS. 12A and 12B are polar diagrams showing a crystal direction.
Figure 12B:
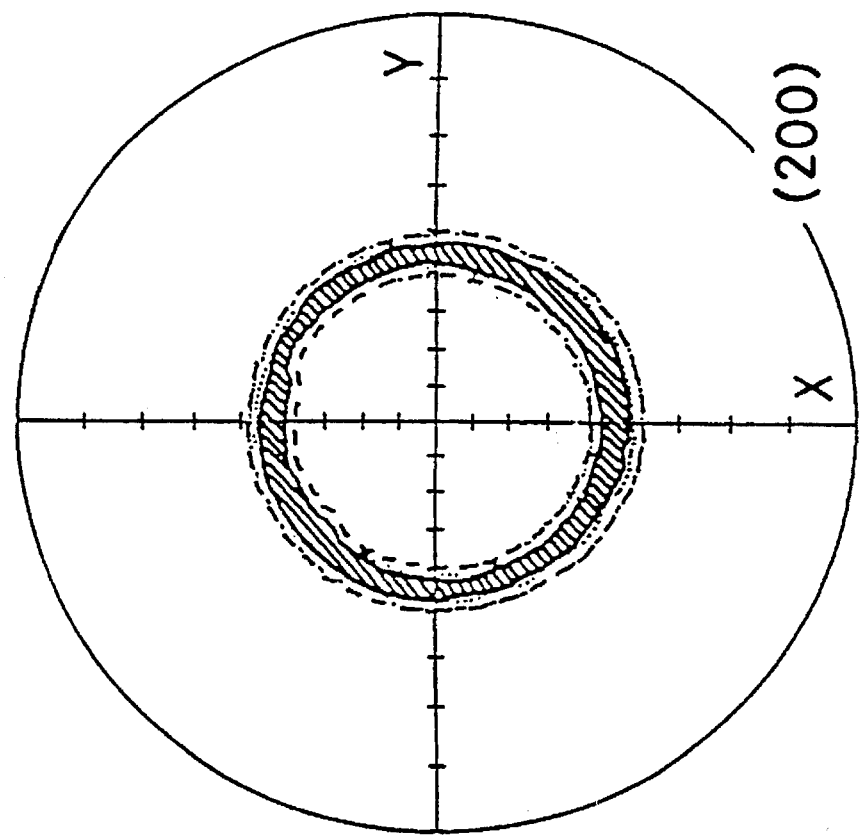

When the Au base layer is present, if the substrate is held horizontally, i.e., if metallic particles are mainly applied perpendicularly to the substrate, the concentration of the (100) pole is stronger than that shown in FIG. 10A, as shown in FIG. 12A, and the ring-shaped distribution of the (200) pole is clear and well symmetrical as shown in FIG. 12B.

Figure 13B:
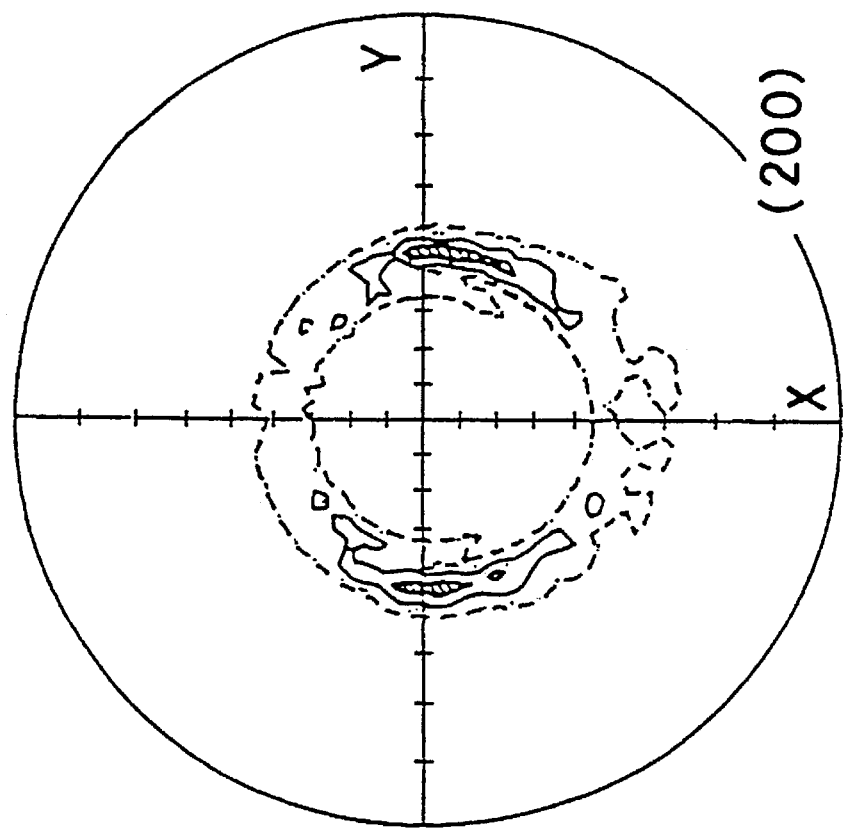
FIGS. 13A and 13B are polar diagrams showing a crystal direction.
Figure 13A:
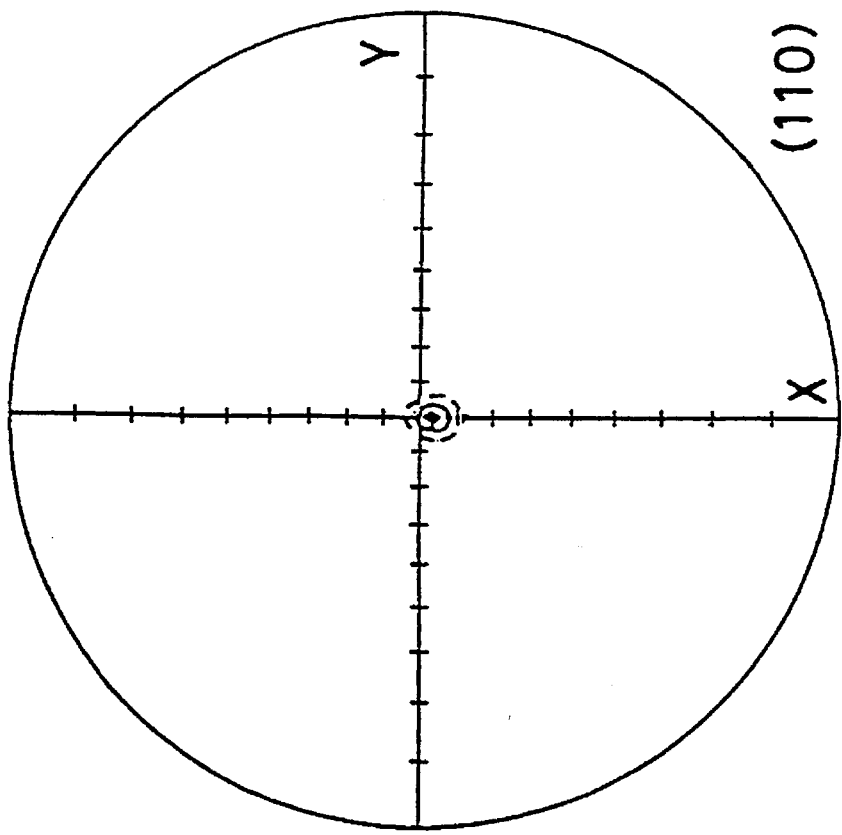

Even if the substrate surface is tilted 30°, the concentration of the (110) pole is present near the line normal to the substrate surface, as shown in FIG. 13A.

The (200) pole clearly concentrates in the Y-Z plane in the angle α of elevation ~45° symmetrically at two regions, though the ring-shaped distribution thereof is collapsed as compared with FIG. 12B.

The specimens with the films deposited on the Au base layer on the substrate tilted 30° are characterized in that both (110) and (200) poles concentrate in narrow regions.

Figure 14:
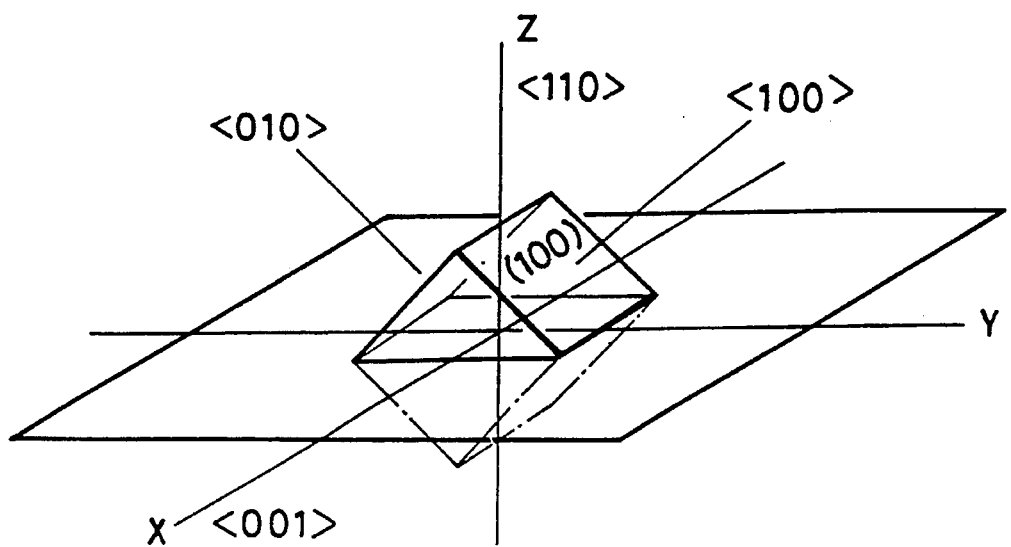
FIG. 14 is a diagram showing a crystal orientation.

A crystal orientation which exhibits such a pole distribution is shown in FIG. 14. It can be seen from FIG. 14 that the (110) face lies parallel to the film surface and the <001> axis lies parallel to the X-axis.

Although not shown in FIGS. 13A and 13B because of the limitations (only the angle α of elevation ≧15° can be measured) of the apparatus used to plot the polar diagrams, the crystal orientation shown in FIG. 14 indicates that the <001> and <00-1> axes extend in the X and –X directions in the film plane.

The fact that the crystalline magnetic anisotropy constant $K_1$ of the material has a positive value is equivalent to a mathematical expression that the <100> axis and a direction equivalent thereto are easy axes of magnetization. Therefore, if the crystalline magnetic anisotropy constant $K_1$ of the material with the (110)<001> orientation as shown in FIG. 14 is positive, then the easy axes of magnetization expected only from the crystalline magnetic anisotropy with respect to that material are the X and –X directions.

Figure 15:
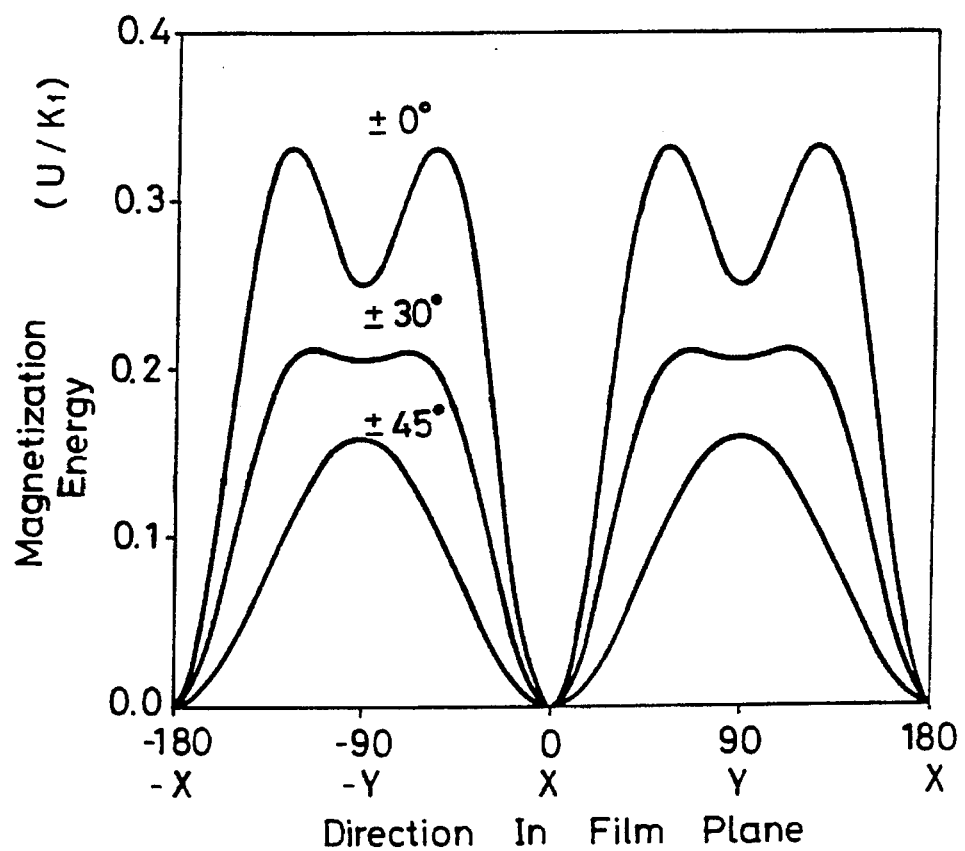
FIG. 15 is a diagram of magnetization energy.

The actually calculated energy that is required to orient magnetization in a certain direction (β) in the film plane is illustrated in FIG. 15.

The magnetization energy for the single crystal with the (110)<001> orientation as shown in FIG. 14 is represented by a curve indicated by ±0° in FIG. 15, and the minimum values of the energy in the X and −X directions indicate that the magnetization is liable to be orientated in those directions.

Actually sputtered films are not single-crystal thin films, but polycrystalline thin films containing a number of crystal grains, and their orientations have a distribution around the complete (110)<001> orientation. Inasmuch as the skirt of the ring-shaped distribution is seen from the polar diagram shown in FIG. 13B, it can be understood that the actual magnetic film on the Au base layer contains the crystal with the (110)<001> orientation that has been rotated about the Z-axis normal to the substrate, which happens to be in alignment with the <110> axis of the crystal.

A detailed quantitative analysis of the polar diagram shows that the component, whose deposited proportion in the entire crystal is ⅑, for creating the crystalline magnetic anisotropy in the magnetic film on the Au base layer, is distributed in the range of ±45° from the (110)<001> orientation.

The distribution of ±45° gives rise to a crystal anisotropy of $0.16 \times K_1$ and reaches such a magnitude as to cancel out the shape anisotropy with $K_1 = 6 \times 10^3$ (J/m$^3$).

The difference |Ktot| and the difference |Kc| are preferably selected to fall in the range of |Ktot|<50<|Kc| (J/m$^3$) as described above. The reason for this will be described below.

As shown in FIG. 8, the magnetic anisotropy of a specimen whose soft magnetic characteristics are poor with the coercive force Hc is 200 A/m or higher is in the range:

$$|\Delta Hk| > 100 (A/m)$$

from FIG. 9. This magnetic anisotropy is converted into magnetic anisotropy energy (J/m$^3$) as follows:

$$K_{tot} \approx \frac{1}{2} Ms \times (\Delta Hk)$$
$$= \frac{1}{2} \times 1 \ [T] \times 100 \ [A/m] = 50 \ [J/m^3]$$

It is of a general fact that soft magnetic characteristics cannot be obtained if the magnetic anisotropy is large. Meeting the condition:

$$|K_{tot}| < 50 (J/m^3)$$

is preferred to achieve good soft magnetic characteristics.

While the absolute value of the crystalline magnetic anisotropy energy that is evaluated from the calculations based on the crystal grain direction distribution contains measurement-induced errors, it can be determined considerably certainly in the range of |Kc|>50 (J/m$^3$). Therefore, in the range of |Ktot|<50<|Kc|, the shape magnetic anisotropy and the stress-induced magnetic anisotropy can be canceled out without fail.

The crystalline magnetic anisotropy constant $K_1$ is selected to be in the range of $3 < K_1 < 10$ (10$^3$ J/m$^3$) according to the inequality (4) above because if it were equal to or lower than 3 (10$^3$ J/m$^3$), it would not cancel out the crystal anisotropy, and if it were equal to or higher than 10 (10$^3$ J/m$^3$), the coercive force would increase.

In the above embodiment, the substrate 1 is made of ceramics. However, the same results as described above are achieved when the substrate 1 is made of ferrite. While the base layer 3 is made of Au in the above embodiment, the same results as described above are achieved when the base layer 3 is made of Pt. Alternatively, the base layer 3 may be of a multilayer structure including a lower layer of Cr and an upper layer of Au or Pt, and may comprise a single layer of Cr, Au, or Pt.

With the present invention, as described above, the soft magnetic thin film 2 of good properties can be fabricated by applying metallic particles obliquely to the substrate surface that is tilted. Heretofore, the soft magnetic characteristics can be achieved only in a certain composition range for Sendust (FeAlSi alloy) or Sofmax (FeRuGaSi alloy) that has been fabricated in isotropic configuration, and hence the material cannot be made Fe-rich beyond that composition range. However, if a larger shape magnetic anisotropy is given to a thin-film material by oblique deposition, then the principles of the present invention are applicable to achieve a soft magnetic thin film of a composition different from the conventional composition, e.g., an Fe-rich composition with a higher saturation flux density Bs. Thus, the soft magnetic thin film according to the present invention may be used to provide various magnetic heads of better recording and reproducing characteristics and high saturation magnetic characteristics.

It is customary to control the magnetic domain structure for improving the characteristics of magnetic heads. One well known example is seen in a thin-film head of Permalloy (Fe—Ni alloy). Such magnetic domain control is carried out by appropriately giving a slight amount of magnetic anisotropy. The concept of the combination of crystalline magnetic anisotropy and another anisotropic component according to the present invention is not only effective to minimize the total magnetic anisotropy, but also available for such anisotropic adjustment.

the soft magnetic thin film according to the present invention may be used as a thin-film magnetic layer of a laminated core in a magnetic head or a thin-film core in a thin-film head.

Alternatively, the soft magnetic thin film according to the present invention may be used as a soft magnetic thin film of high saturation flux density which defines a magnetic gap in any of various magnetic heads.

Figure 16:
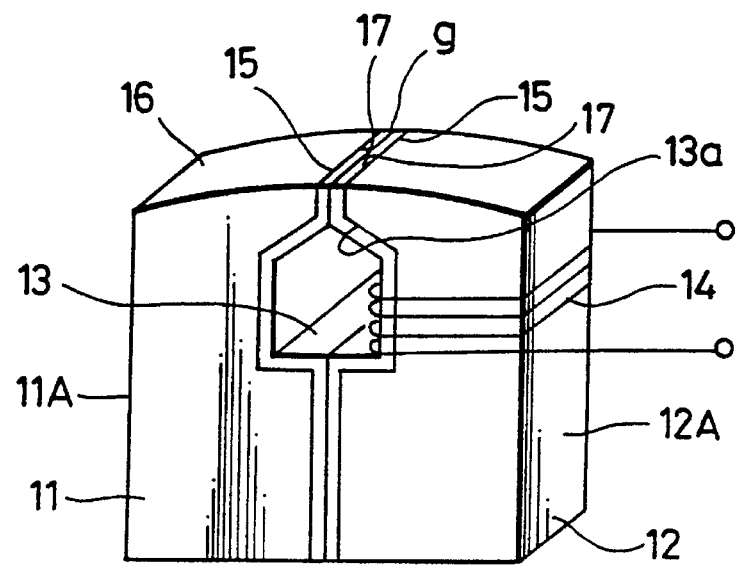
FIG. 16 is a perspective view of a magnetic head according to the present invention.

One such magnetic head will be described by way of example with reference to FIG. 16. As shown in FIG. 16, the magnetic head has a pair of core halves 11, 12 with an operating magnetic gap g defined between front end surfaces that confront each other. The core halves 11, 12 have respective core members 11A, 12A made of magnetic ferrite, nonmagnetic ferrite, ceramics, or the lie. The operating magnetic gap g is defined between the front end gap-forming surfaces 17 each covered with a metallic soft magnetic thin film 15 of high permeability and high saturation flux density.

Irrespective of whether the core members 11A, 12A are nonmagnetic or magnetic, the metallic soft magnetic thin films 15 have a high saturation flux density with respect to the core members 11A, 12A as well as the region of the magnetic gap g. The metallic soft magnetic thin films 15 continuously extend rearwardly from the magnetic gap g through a groove 13 that serves to accommodate a head winding 14 and to limit the depth of the magnetic gap g, the groove 13 being defined by front inner wall surfaces 13a of the core members 11A, 12A. The metallic soft magnetic thin films 15 extend across the head winding 14, and serve as a portion of a closed magnetic path including the operating magnetic gap g. The magnetic head has a contact surface 16 lying across the magnetic gap g for sliding contact with a magnetic recording medium (not shown).

Each of the metallic soft magnetic thin films 15 comprises the soft magnetic thin film 2 (see FIG. 3) according to the present invention.

Figure 17A:
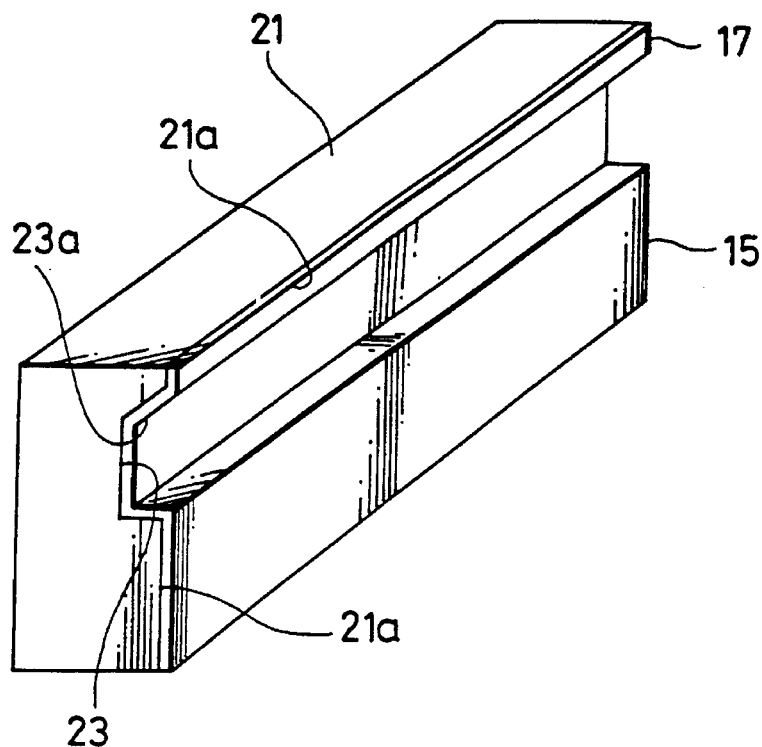
FIGS. 17A and 17B are perspective views showing a process of manufacturing the magnetic head shown in FIG. 16.
Figure 17B:
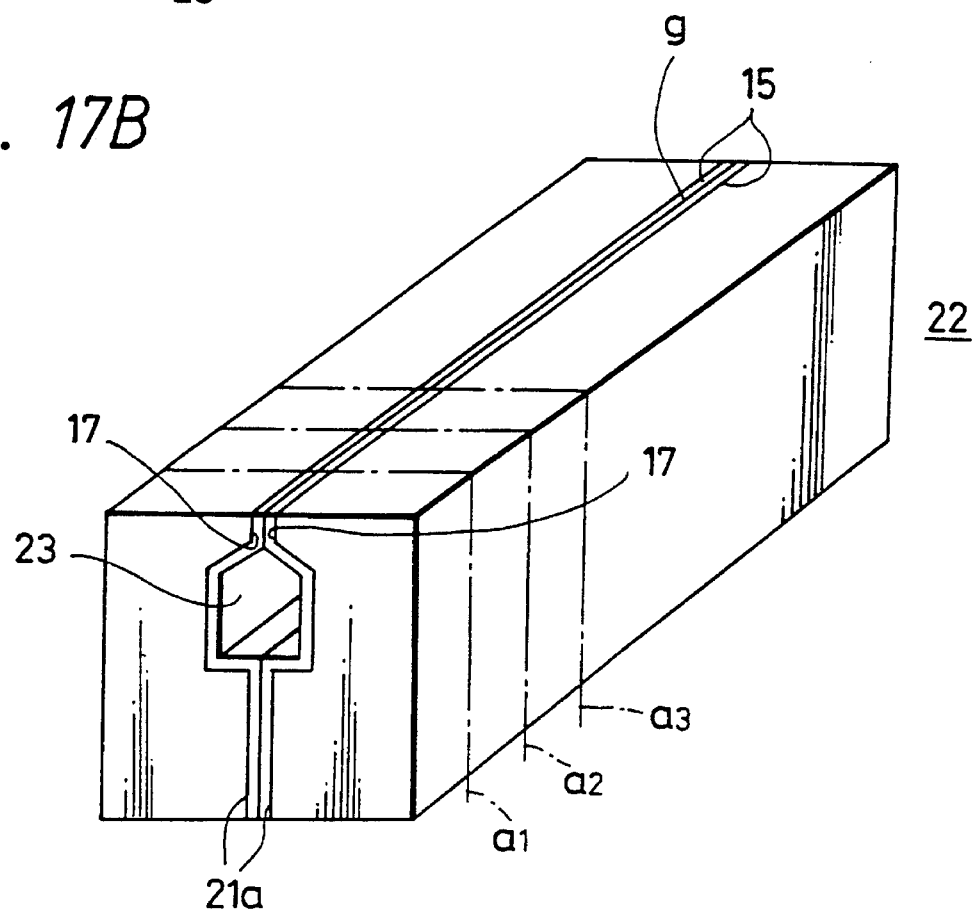

The magnetic head shown in FIG. 16 may be manufactured according to a process shown in FIGS. 17A and 17B. As shown in FIG. 17A, an elongate groove 23, which will eventually serve as the groove 13, is longitudinally defined in a side 21a of a magnetic or nonmagnetic core block 21, which will finally be cut into core members 11A, 12A. Then, the side 21a is ground to a mirror finish, and a metallic soft magnetic thin film 15 of high permeability and high saturation flux density is deposited on the side 21a including the groove 23.

Thereafter, as shown in FIG. 17B, two such core blocks 21 are combined into a combined block 22 with the respective sides 21a covered with the respective metallic soft magnetic thin films 15 being disposed in spaced, confronting relationship to each other through a nonmagnetic layer or gap spacer, defining an operating magnetic gap g between the confronting surfaces.

The combined block 22 is then transversely cut off along chain lines $a_1, a_2, a_3, \ldots$ perpendicularly to the gap-forming surfaces of the operating magnetic gap g into magnetic head blocks of a certain width. The front surfaces of the magnetic head blocks are then ground into contact surfaces 16 for sliding contact with a magnetic recording medium, and then head windings 14 are wound on the magnetic head blocks, thus completing magnetic heads.

Each of the metallic soft magnetic thin films 15 comprises the soft magnetic thin film 2 according to the present invention.

As shown in FIG. 17A, the core block 21 corresponds to the substrate 1 on which the soft magnetic thin film 2 is deposited. Either the side 21a or a wall surface 23a of the groove 23 is tilted with respect to the target surface. Actually, the surfaces of a number of core blocks 21 on which the soft magnetic thin film 2 will be deposited are tilted with respect to the target surface when magnetic heads are mass-produced.

Since the metallic soft magnetic thin films 15 which comprise the soft magnetic thin film 2 according to the present invention have good soft magnetic characteristics, the magnetic head can produce an intensive recording magnetic field, for example, for recording desired information on a magnetic recording medium with high recording density under high coercive forces.

Figure 18:
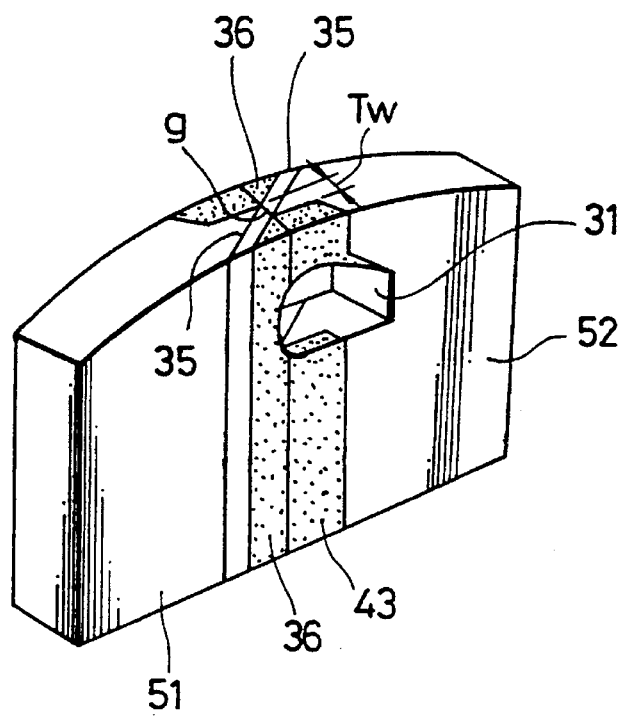
FIG. 18 is a perspective view of a magnetic head according to another embodiment of the present invention.

FIG. 18 shows in perspective a magnetic head according to another embodiment of the present invention. As shown in FIG. 18, the magnetic head comprises a pair of magnetic core halves 51, 52 of Mn—Zn ferrite of high permeability. The core halves 51, 52 abut against each other through confronting surfaces, which are obliquely cut off into slant surfaces 33 (see FIGS. 19A, 19B, 19C) each covered with a soft magnetic thin film 35 of high saturation flux density such as of Sendust. The soft magnetic thin films 35 on the respective slant surfaces 33 are held in abutment against each other, defining a magnetic gap g therebetween. The magnetic head has a pair of grooves 32, 37 (see FIGS. 20A, 20B, 20C) for limiting a track width that are defined one on each side of the magnetic gap g. These grooves 32, 37 are filled with nonmagnetic materials 36, 43 for providing a surface for sliding contact with a magnetic recording medium and for preventing the soft magnetic thin film 35 from being worn off. The magnetic head shown in FIG. 18 is highly reliable, resistant to wear, and has good magnetic characteristics.

The magnetic head shown in FIG. 18 may be manufactured by a method disclosed in Japanese laid-open patent publication No. 61-105710 proposed by the applicant.

The disclosed method will be described below with reference to FIGS. 19A, 19B, 19C, 20A, 20B, 20C.

Figure 19A:
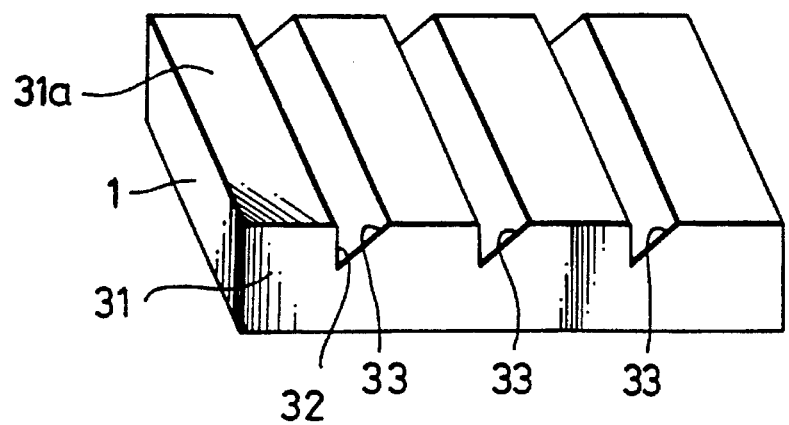
FIGS. 19A, 19B, 19C, 20A, 20B, and 20C are perspective views showing a process of manufacturing the magnetic head shown in FIG. 18.

First, as shown in FIG. 19A, a plurality of first parallel straight grooves 32 for limiting a track width are defined in a principal surface 31a of a substrate 31 which is made of Mn—Zn ferrite, for example, by a rotating grinding wheel. The principal surface 31a serves as a gap-forming surface. The first grooves 32 have the same width and depth, and have respective slant surfaces 33.

Figure 19B:
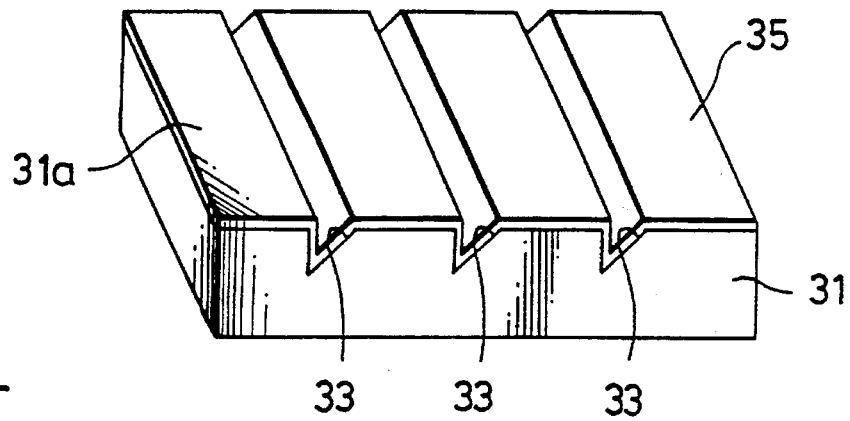

Then, as shown in FIG. 19B, a metallic soft magnetic thin film 35 is deposited on the principal surface 31a including the grooves 32.

Figure 19C:
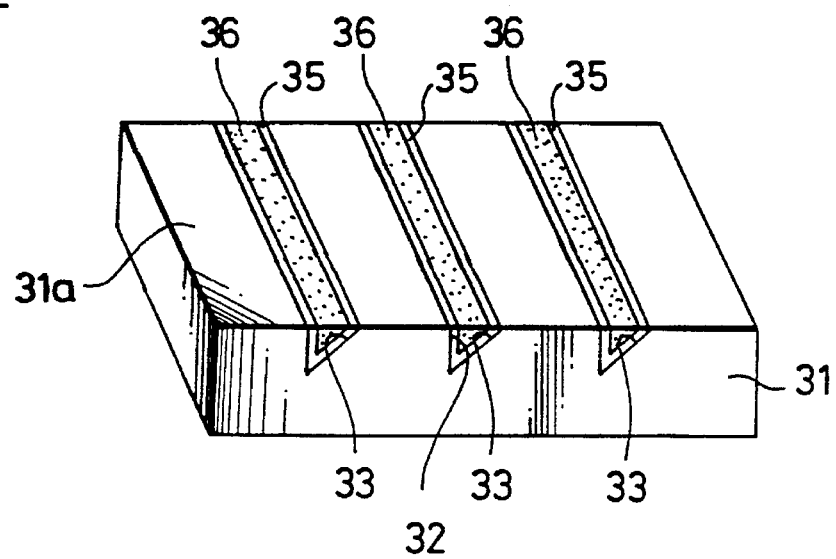

As shown in FIG. 19C, the grooves 32 in which the metallic soft magnetic thin film 35 is deposited are subsequently filled with a nonmagnetic material 36 such as glass, and then the metallic soft magnetic thin film 35 on the principal surface 31a is ground away.

Figure 20A:
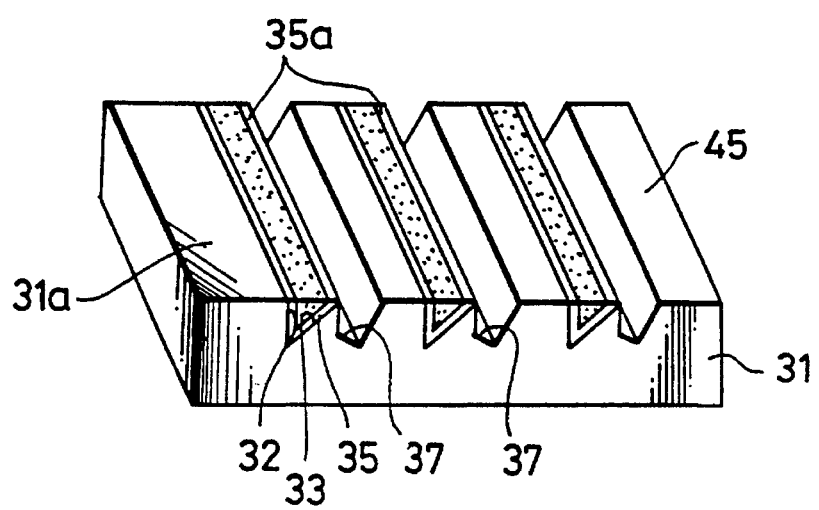

Thereafter, as shown in FIG. 20A, a plurality of second parallel straight grooves 37 for limiting a track width are defined in the principal surface 31 adjacent to the slant surfaces 33 covered with the metallic soft magnetic thin film 35 and parallel to the first grooves 32. The second grooves 37 have the same width and depth. Each of the second grooves 37 is positioned such that one edge thereof is substantially aligned with an edge 35a of the metallic soft magnetic thin film 35 on one of the slant surfaces 33, the edge 35a lying flush with the principal surface 31a of the substrate 31. Then, the principal surface 31a is ground to a mirror finish to correct the track width Tw. The track width Tw on the principal surface 31a, i.e., the gap-forming surface, is limited by the grooves 32, 37. In this manner, a core block 45 with the edges 35a of the metallic soft magnetic thin films 35 on the respective slant surfaces 33 is fabricated. Actually, two such core blocks are fabricated, the other core block being indicated at 46 in FIG. 20B.

Figure 20B:
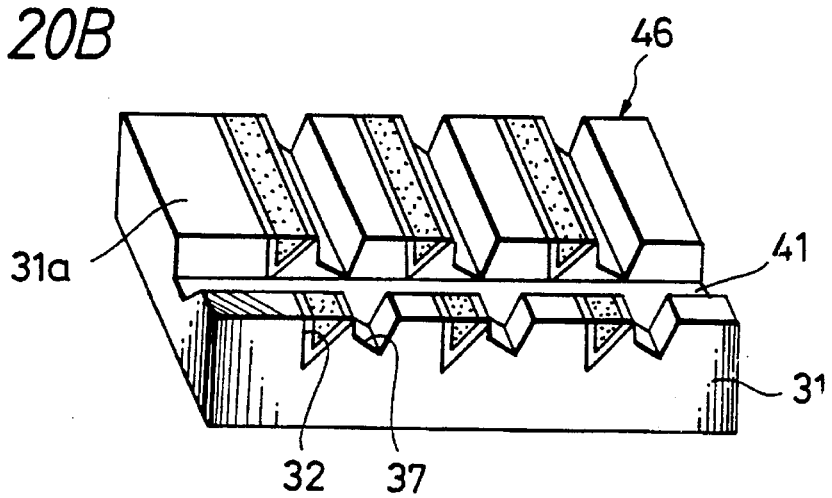

Then, as shown in FIG. 20B, a winding groove 41 is defined in the other core block 46 perpendicularly to the grooves 32, 37.

Figure 20C:
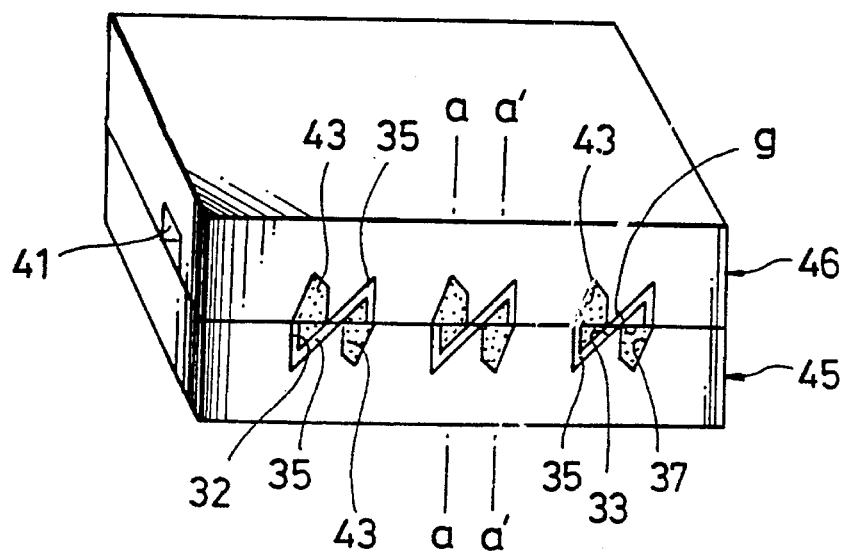

Thereafter, as shown in FIG. 20C, the core blocks 45, 46 are combined with each other such that the first grooves 32 of each of the core blocks 45, 46 confront the second grooves 37 of the other core block and the metallic soft magnetic thin films 35 of the core blocks 45, 46 are superposed on each other through a gap spacer that is deposited on one of the principal surfaces 31a of the core blocks 45, 46, thereby defining a magnetic gap g between the metallic soft magnetic thin films 35. The winding groove 41 is filed with a nonmagnetic material 43 such as glass. Then, the core blocks 45, 46 are fused to each other, with the nonmagnetic material 43 filling the second grooves 37. In this manner, the core blocks 45, 46 are integrally joined to each other, providing a combined block.

As shown in FIG. 20C, the combined block is then sliced along lines a—a, a'–a' into a plurality of head tips. The surfaces of the head tips for sliding contact with a magnetic recording medium are ground into arcuate surfaces, thus completing the magnetic head as shown in FIG. 18. As shown in FIG. 18, the metallic soft magnetic thin film 35 is inclined at an angle to the magnetic gap g, and the magnetic gap g is made up of the soft magnetic thin film 35. Furthermore, the core halves 51, 52 made of ferrite, for example, is highly accurately machined near the magnetic gap g.

In the magnetic head thus fabricated, the metallic soft magnetic thin film 35 deposited on the slant surface 33 makes up a substantial portion of the magnetic path of the magnetic head. Therefore, in the case where the metallic soft magnetic thin film 35 is composed of the soft magnetic thin film 2 according to the present invention, the magnetic head provide good recording and reproducing characteristics.

As described above, the total magnetic anisotropy of the soft magnetic thin film according to the present invention which is fabricated by oblique deposition is smaller than that of the conventional soft magnetic thin film. The soft magnetic thin film according to the present invention may be of a composition that has not possibly been employed heretofore.

The magnetic head with the soft magnetic thin film according to the present invention provides desired recording and reproducing characteristics. Since the soft magnetic thin film can be fabricated by depositing metallic particles obliquely on the substrate, the magnetic head can be mass-produced.

Having described preferred embodiments of the invention with reference to the accompanying drawings, it is to be understood that the invention is not limited to that precise embodiments and that various changes and modifications could be effected by one skilled in the art without departing from the spirit or scope of the invention as defined in the appended claims.

What is claimed is:

1. A soft magnetic thin film which satisfies the following relationship:

where the magnetization energy required to magnetize the soft magnetic thin film in any direction in the plane thereof is referred to as total magnetization energy, $|Ktot|$ is the difference between the maximum and minimum values of the total magnetization energy in every direction in the plane, and $|Kc|$ is the difference between the maximum and minimum values of the magnetization energy in every direction in the plane due to crystalline magnetic anisotropy, wherein the total magnetic anisotropy energy value $|Ktot|$ and the crystalline magnetic anisotropy energy value $|Kc|$ is selected to satisfy the following relationship:

$$|Ktot|<50<|Kc|(J/m^3)$$

wherein the soft magnetic thin film is made of an FeRuGaSi alloy, and wherein the total Fe and Ru in the FeRuGaSi alloy is of at least 75 atomic %.

2. A soft magnetic thin film which satisfies the following relationship:

where magnetization energy required to magnetize the soft magnetic thin film in any direction in the plane thereof is referred to as total magnetization energy, $|Ktot|$ is the difference between the maximum and minimum values of the total magnetization energy in every direction in the plane, and $|Kc|$ is the difference between the maximum and minimum values of the magnetization energy in every direction in the plane due to crystalline magnetic anisotropy, wherein the total magnetic anisotropy energy value $|Ktot|$ and the crystalline magnetic anisotropy energy value $|Kc|$ is selected to satisfy the following relationship:

$$|Ktot|<50<|Kc|(J/m^3)$$

wherein the soft magnetic thin film is made of an FeAlSi alloy.

3. A soft magnetic thin film according to claim 1 or 2, wherein crystalline structure of the soft magnetic thin film has a cubic system and such film has a crystalline magnetic anisotropy constant $K_1$ in the range of: $3<K_1<10$ ($10^3$ J/m$^3$).

4. A soft magnetic thin film assembly comprising:

a substrate, a base layer deposited on said substrate; and a soft magnetic thin film made of an FeRuGaSi alloy wherein the total Fe and Ru in the alloy is of at least 75 atomic % which is deposited on said base layer, said soft magnetic thin film satisfies the following relationship:

$$|Ktot|<|Kc|$$

where magnetization energy required to magnetize the soft magnetic thin film in any direction in the plane thereof is referred to as total magnetization energy, $|Ktot|$ is the difference between the maximum and minimum values of the total magnetization energy in every direction in the plane, and $|Kc|$ is the difference between the maximum and minimum values of the magnetization energy in every direction in the plane due to crystalline magnetic anisotropy.

5. A soft magnetic thin film assembly according to claim 4, wherein said base layer is made of Au.

6. A soft magnetic thin film assembly according to claim 4, wherein said base layer is made of Pt.

7. A magnetic head comprising a soft magnetic thin film made of a FeRuGaSi alloy wherein the total Fe and Ru in the alloy is at least 75 atomic % and which satisfies the following relationship:

$$|Ktot|<|Kc|$$

where magnetization energy required to magnetize said soft magnetic thin film in any direction in the plane thereof is referred to as total magnetization energy, $|Ktot|$ which is the difference between the maximum and minimum values of the total magnetization energy in every direction in the plane, and $|Kc|$ is the difference between the maximum and minimum values of the magnetization energy in every direction in the plane due to crystalline magnetic anisotropy in said soft magnetic thin film.

* * * * *